United States Patent
Fazel et al.

(10) Patent No.: US 8,638,872 B2
(45) Date of Patent: Jan. 28, 2014

(54) SPACE-TIME-STATE BLOCK CODED MIMO COMMUNICATION SYSTEM USING RECONFIGURABLE ANTENNAS

(75) Inventors: Fatemeh Fazel, Boston, MA (US); Alfred Grau Besoli, Irvine, CA (US); Hamid Jafakhani, Irvine, CA (US); Franco De Flaviis, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 892 days.

(21) Appl. No.: 12/748,366

(22) Filed: Mar. 26, 2010

(65) Prior Publication Data
US 2010/0272204 A1 Oct. 28, 2010

Related U.S. Application Data

(60) Provisional application No. 61/164,360, filed on Mar. 27, 2009.

(51) Int. Cl.
*H04B 7/02* (2006.01)
(52) U.S. Cl.
USPC .......................................... 375/267; 375/299
(58) Field of Classification Search
USPC ................................................ 375/267, 299
See application file for complete search history.

(56) References Cited

U.S. PATENT DOCUMENTS 8,270,527 B2 * 9/2012 Castelain et al. ............. 375/295
2007/0286105 A1 * 12/2007 Kim et al. .................. 370/310.1

* cited by examiner

*Primary Examiner* — Shuwang Liu
*Assistant Examiner* — David Huang
(74) *Attorney, Agent, or Firm* — Marcus C. Dawes; Daniel L. Dawes

(57) ABSTRACT

Space-Time-State Block Coded MIMO communication system using reconfigurable antennas. One or more antennas are operates in accordance with a Space-Time-State Block Code (STS-BC) to effectuate channel coding of a signal being transmitted wirelessly between communication devices. In accordance with such an STS-BC, one or more antennas (being reconfigurable in nature) of a communication device are reconfigured in different radiation states. From some perspectives, this may be viewed as performing three-dimensional channel coding, in that, in addition to achieving at least time diversity of signals being transmitted (and also potentially including spatial diversity), state diversity may be achieved by adapting one or more characteristics of one or more antennas within the communication device. Such an STS-BC may operate in an open loop configuration without requiring any feedback from another communication device to which signals are transmitted. If desired, feedback may be employed for adaptively modifying an STS-BC (or selecting another STS-BC).

17 Claims, 14 Drawing Sheets generalized overall codeword: (block diagonal)

$$C = \frac{1}{\sqrt{2P}} \begin{bmatrix} A(S_1, S_2) & 0 & \cdots & 0 & 0 \\ 0 & A(S_3, S_4) & \cdots & 0 & 0 \\ \vdots & \vdots & \ddots & \vdots & \vdots \\ 0 & 0 & \cdots & 0 & A(S_{2P-1}, S_{2P}) \end{bmatrix}$$

respective codewords:

$$C_1 = \frac{1}{2} \begin{bmatrix} s_1 + \tilde{s}_3 & s_2 + \tilde{s}_4 \\ -s_2^* - \tilde{s}_4^* & s_1^* + \tilde{s}_3^* \end{bmatrix},$$

$$C_2 = \frac{1}{2} \begin{bmatrix} s_1 - \tilde{s}_3 & s_2 - \tilde{s}_4 \\ -(s_2^* - \tilde{s}_4^*) & s_1^* - \tilde{s}_3^* \end{bmatrix}$$

1101  1103 state selection module 1199 overall codeword: (block diagonal)

$$C = \frac{1}{2} \begin{bmatrix} s_1 + \tilde{s}_3 & s_2 + \tilde{s}_4 & 0 & 0 \\ -s_2^* - \tilde{s}_4^* & s_1^* + \tilde{s}_3^* & 0 & 0 \\ 0 & 0 & s_1 - \tilde{s}_3 & s_2 - \tilde{s}_4 \\ 0 & 0 & -(s_2^* - \tilde{s}_4^*) & s_1^* - \tilde{s}_3^* \end{bmatrix}$$

Fig. 11

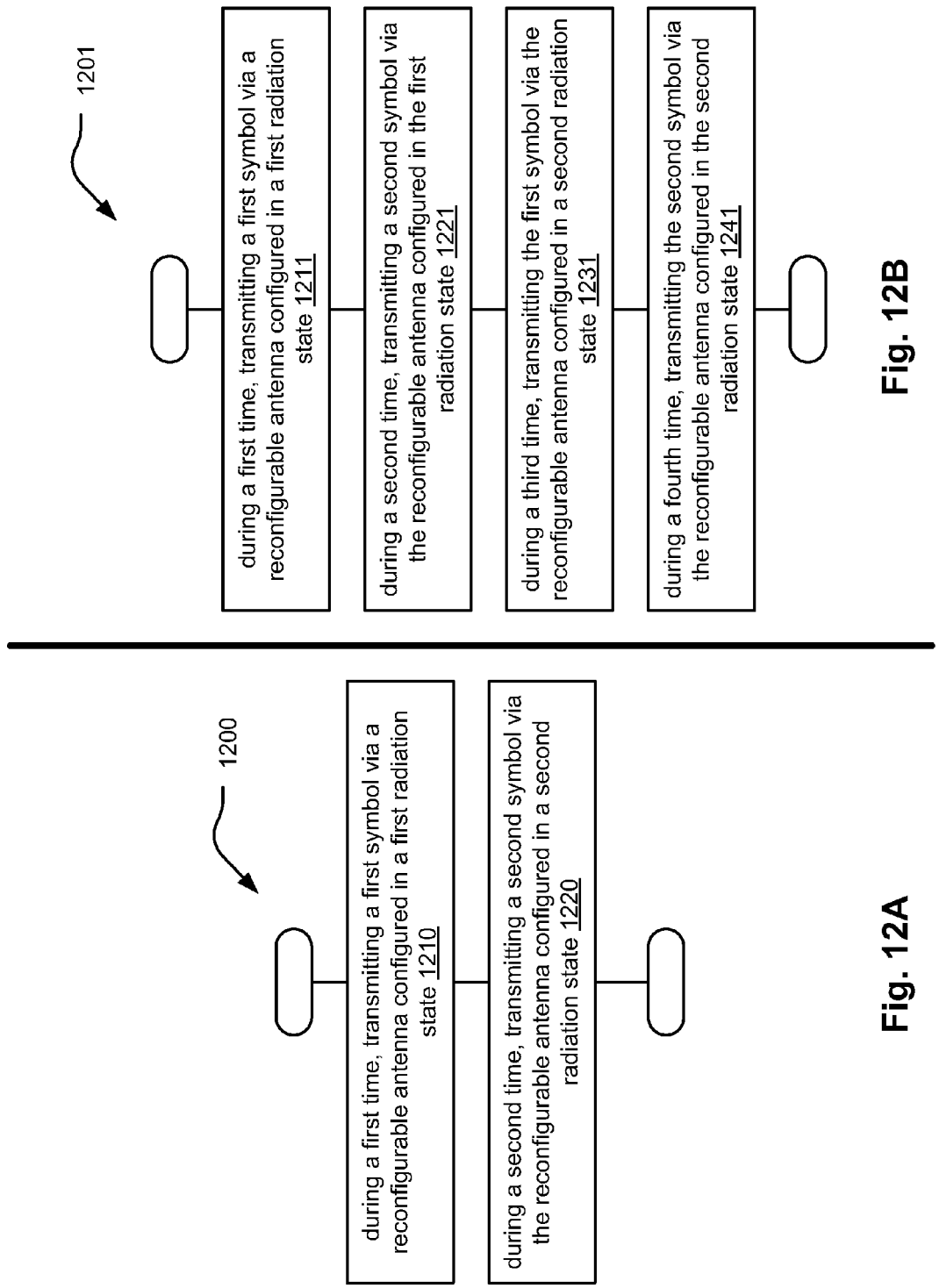

SPACE-TIME-STATE BLOCK CODED MIMO COMMUNICATION SYSTEM USING RECONFIGURABLE ANTENNAS

CROSS REFERENCE TO RELATED PATENTS/PATENT APPLICATIONS

Provisional Priority Claim

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/164,360, entitled "Space-time-state block coded MIMO communication system using reconfigurable antennas," pending.

STATEMENT REGARDING FEDERALLY SPONSORED RESEARCH OR DEVELOPMENT

This invention was made with government support under grant 0424454 awarded by the National Science Foundation. The government has certain rights to this invention.

BACKGROUND OF THE INVENTION

1. Technical Field of the Invention

The invention relates generally to communication systems; and, more particularly, it relates to channel coding as performed within wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks, among other types of communication systems. Each type of communication system is constructed, and typically operates, in accordance with one or more communication standards, protocols, best or recommended practices, etc. For instance, wireless communication systems may operate in accordance with one or more standards including, but not limited to, the Institute of Electrical and Electronics Engineers (IEEE) 802.11, IEEE 802.15, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc. communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network or communication system.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, satellite modem, etc.). As is known, the receiver is coupled to the antenna and includes a low noise amplifier (LNA), one or more intermediate frequency stages, a filtering stage, and a data recovery stage. The LNA receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas or antennae (equivalent terms which may be used interchangeably), of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, IEEE 802.11a, IEEE 802.11b, or IEEE 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and analog to digital converters (ADCs)). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

In accordance with such wireless communication systems, there seems to be a continual need for improvements in channel coding, as within a communication device, that is performed to signals before being transmitting wirelessly to one or more other communication device. The existent means of channel coding in the art do not meet continually increasing the expectations to provide for greater throughput.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 11 is a diagram showing a generic mathematical representation of a codeword encompassing multiple propagation states, and specifically related to an embodiment of a communication device including two antennae.
FIG. 12A, FIG. 12B, FIG. 13A, FIG. 13B, FIG. 14A, and FIG. 14B illustrate various embodiments of methods for operating a communication device in accordance with various types of STS-BCs.

DETAILED DESCRIPTION OF THE INVENTION

Generally speaking, a goal within communication systems is to transmit information (within signals) from a first communication device to a second communication device via one or more communication channels. Certain wireless communication devices operate by transmitting signals wirelessly, via one or more antennas, to another wireless communication device. Various types of antenna may be employed within such wireless communication devices.

Reconfigurable antennas, as may be employed within various embodiments in accordance with aspects of the invention, offer a promising solution to the problem of space limitation in high-performance wireless communication within wireless communication device (including handset devices such as telephones, personal digital assistants, etc.). Herein, a novel transmission scheme, operative for performing channel coding such as in accordance with a Space-Time-State Block Code (STS-BC), is capable of extracting maximum diversity gains within a communication device employing one or more reconfigurable antennas at the transmitter, the receiver or at both ends of the wireless link, without the need for feedback (e.g., operating in an open loop configuration). It is also noted that, in other embodiments, a closed loop configuration may also be employed. Any of a variety of types of communication systems may employ such functionality, including single-input-multiple-output (SIMO), multiple-input-single-output (MISO), and multiple-input-multiple-output (MIMO).

For a MIMO communication system implementation, using reconfigurable antennas at the transmitter, a state-switching scheme in combination with an appropriate three-dimensional block code (STS-BC) may be employed thereby providing a maximum possible level of diversity in accordance with such channel coding. When reconfigurable antennas are implemented at the receiver end, a state-selection scheme allows for effectuating maximum diversity gains. Moreover, the state-selection approach presented herein is able to obtain selection gain in addition to diversity gain. As shown, both state-switching and state-selection schemes can be combined together when reconfigurable antennas are used at both ends of the wireless link.

Figure 1:
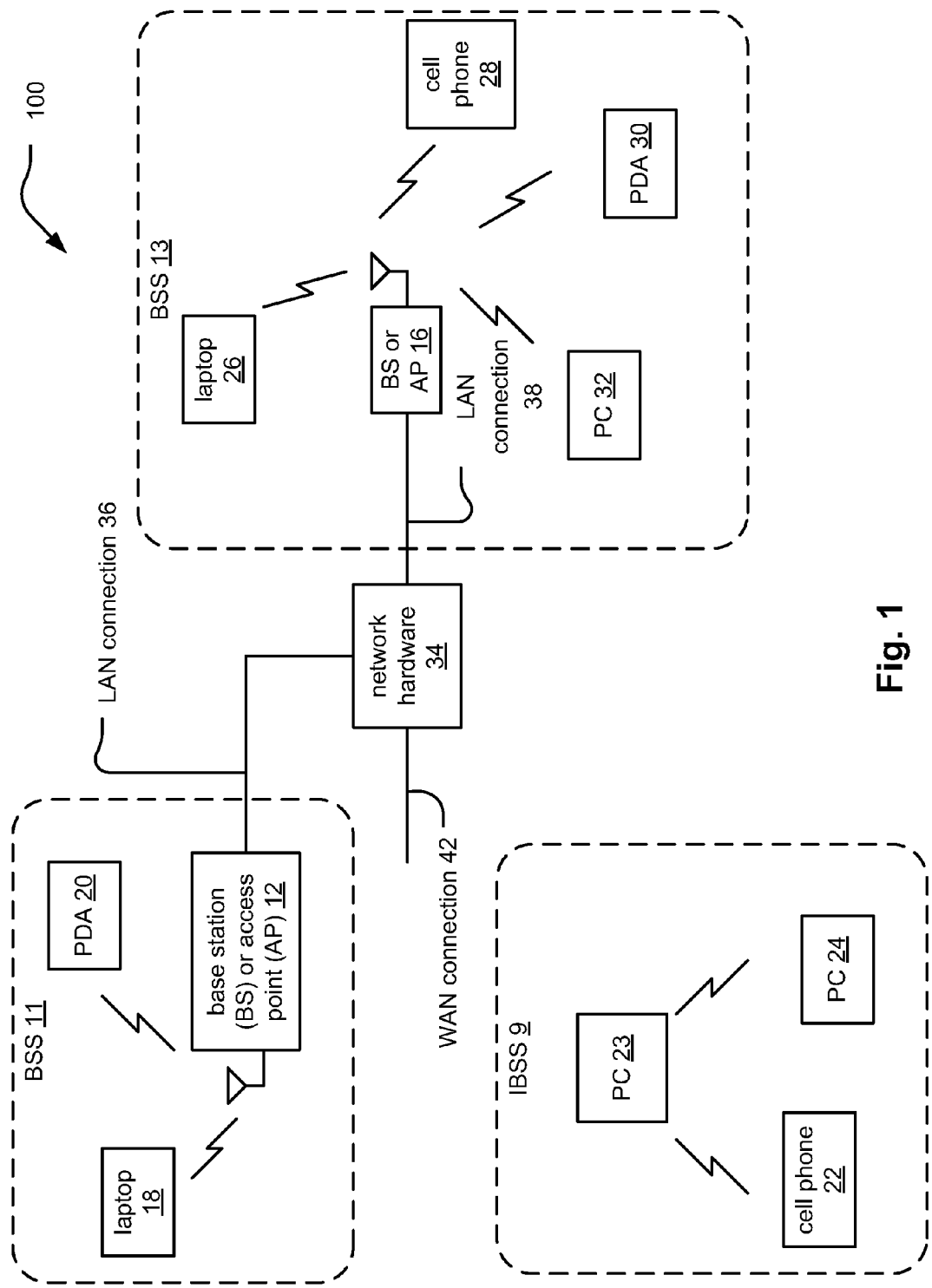
FIG. 1 is a diagram of a wireless communication system.

FIG. 1 is a diagram illustrating a communication system 100 that includes a plurality of base stations and/or access points 12, 16, a plurality of wireless communication devices 18-32 and a network hardware component 34. It is noted that the network hardware 34, which may be a router, switch, bridge, modem, system controller, etc. provides a wide area network connection 42 for the communication system 100. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the communication system 100 or to communicate outside of the communication system 100, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the communication system 100 and provides connectivity to other networks via the WAN connection 42. To communicate with the wireless communication devices within its BSS 11 or 13, each of the base stations or access points 12-16 has an associated antenna or antennas (e.g., such as may be implemented in an antenna array). For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 100.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
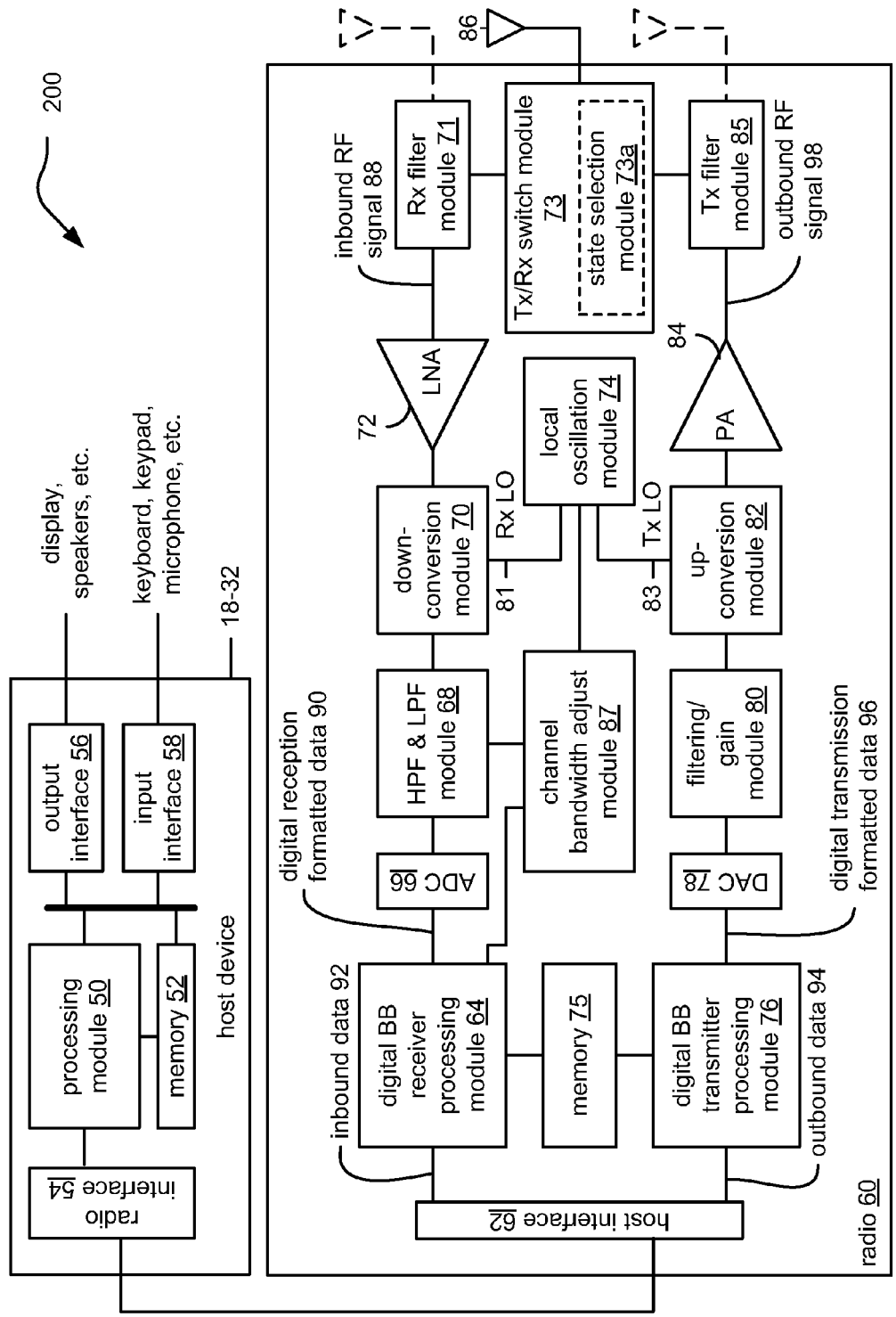
FIG. 2 is a diagram of a wireless communication device.

FIG. 2 is a diagram illustrating a wireless communication device 200 that includes the host device 18-32 and an associated radio 60. For cellular telephone hosts, the radio 60 is a built-in component (e.g., integrated within a respective host device). For personal digital assistants hosts, laptop hosts, and/or personal computer hosts, the radio 60 may be built-in (e.g., integrated) or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device embodiment, the respective processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. In some embodiments, the output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter (ADC) 66, a high pass filter (HPF) and low pass filter (LPF) module 68, an IF mixing down conversion stage 70, a receiver filter 71, a low noise amplifier (LNA) 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier (PA) 84, a transmitter filter module 85, a channel bandwidth adjust module 87, and an antenna 86 (or a larger number of antennas). The antenna 86 may be a single antenna that is shared by the transmit and receive paths as regulated by the Tx/Rx switch 73 (which can include a state selection module 73a for operating the one or more antennas 86 in accordance with a Space-Time-State Block Code (STS-BC)), or may include separate antennas for the transmit path and receive path. The antenna implementation will depend on the particular standard or manner of operation to which the wireless communication device 200 is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding (e.g., in accordance with any one or more error correction codes (ECCs) and/or forward error correction (FEC) codes), and/or descrambling, and/or other such receiver end processing operations. The digital transmitter functions include, but are not limited to, scrambling, encoding, constellation mapping (e.g., symbol mapping to a constellation having a label mapping of the constellation points therein), modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, etc.) to produce outbound baseband signals 96. The outbound baseband signals 96 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter (DAC) 78 converts the outbound baseband signals 96 from the digital domain to the analog domain (e.g., performs digital sampling of a continuous time signal thereby generating a discrete time signal). The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier (PA) 84 amplifies the RF signals to produce outbound RF signals 98, which are filtered by the transmitter filter module 85. The one or more antennas 86 transmit the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. It is noted that the Tx/Rx switch 73, which can include the state selection module 73a, can also perform receiver processing in accordance with an STS-BC (which may be the same STS-BC employed for transmitting signals or may be a different STS-BC alternatively tailored for receiving of signals).

The Rx filter 71 provides the filtered RF signals to low noise amplifier (LNA) 72, which amplifies the signals 88 to produce an amplified inbound RF signals. The low noise amplifier (LNA) 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass filter (HPF) and low pass filter (LPF) module 68 filters, based on settings provided by the channel bandwidth adjust module 87, the inbound low IF signals or the inbound baseband signals to produce filtered inbound signals.

The analog-to-digital converter (ADC) 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kHz to a few MHz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard or manner of operation being implemented by radio 60. The host interface 62 provides the recaptured inbound data 92 to the host device 18-32 via the radio interface 54.

It is noted that the wireless communication device 200 of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60 (e.g., the one or more antennas 86 in some embodiments), may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
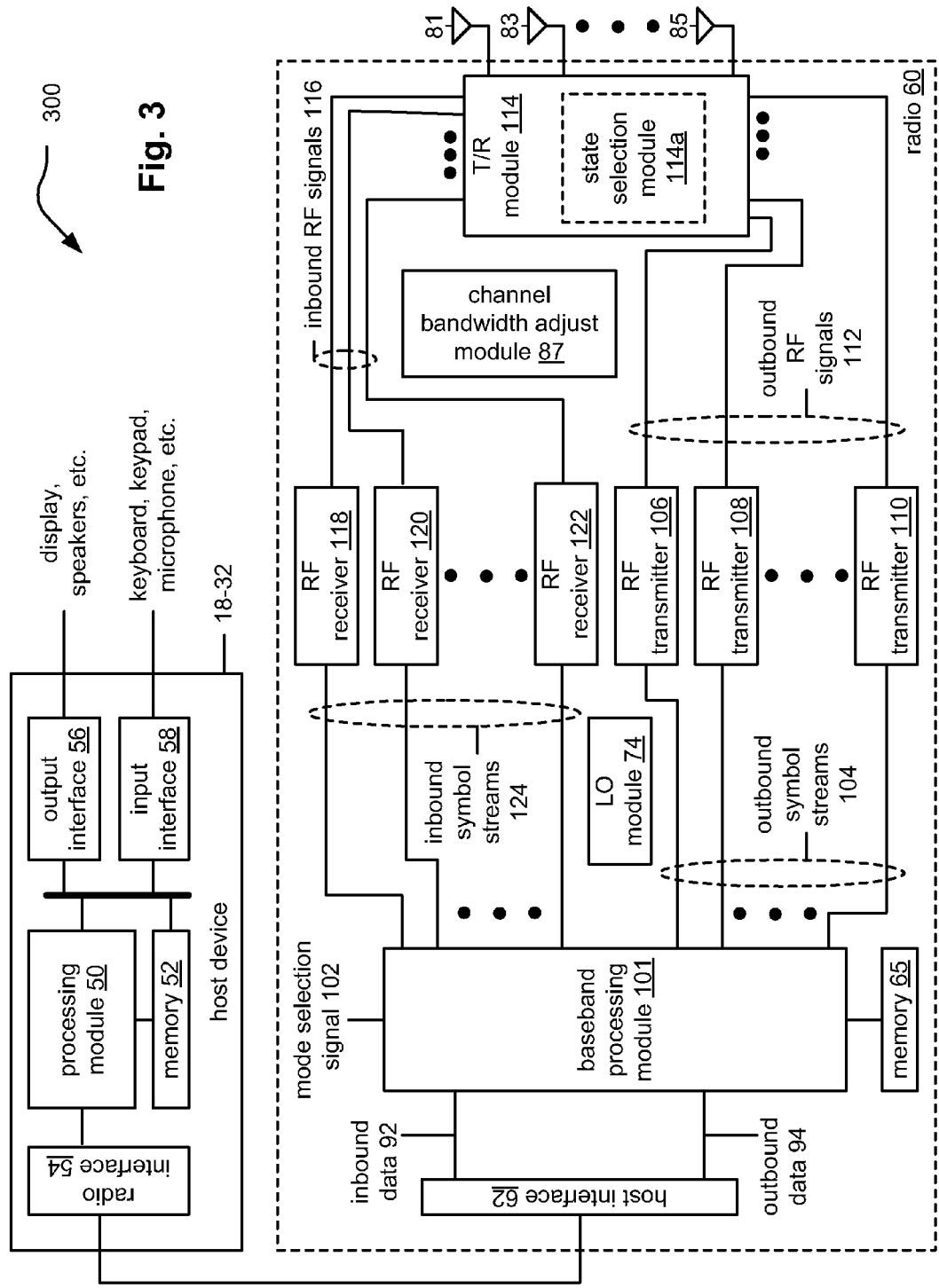
FIG. 3 is a diagram of another wireless communication device.

FIG. 3 is a diagram illustrating a wireless communication device 300 that includes the host device 18-32 and an associated radio 60. For cellular telephone hosts, the radio 60 is a built-in component (e.g., integrated). For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 101, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation de-mapping, decoding, de-interleaving, fast Fourier transform (FFT), cyclic prefix removal, space and time decoding, and/or descrambling. The digital transmitter functions include, but are not limited to, scrambling, encoding, interleaving, constellation mapping, modulation, inverse fast Fourier transform (IFFT), cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM (Orthogonal Frequency Division Multiplexing) symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As noted with respect to other embodiments, it is noted that the wireless communication device 300 of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

It is also noted that any of a variety of different types of signaling may be employed within a communication device operating in accordance with various aspects presented herein including, though not limited to, orthogonal frequency division multiplexing (OFDM) signaling, time division multiple access (TDMA) signaling, code division multiple access (CDMA) signaling, or synchronous code division multiple access (S-CDMA) signaling. Also, any of a variety of types of symbol mappings (e.g., constellations with respective mapping of the constellation points therein) may be employed within a communication device operating in accordance with various aspects presented herein including, though not limited to, Binary Phase Shift Keying (BPSK), Quadrature Phase Shift Keying (QPSK) or Quadrature Amplitude Modulation (QAM), 8 Phase Shift Keying (8-PSK), 16 QAM, 32 QAM, 64 QAM, 128 QAM, 256 QAM, 516 QAM, and 1024 QAM, and/or any other type of symbol mapping.

Various aspects of the invention as presented herein address channel coding as performed to signals before being launched into a communication channel (e.g., launched into the air via one or more antennas in a wireless communication system implementation).

Referring again to MIMO communication systems, such MIMO communication systems are capable of providing high data rates and reliable communication over fading channels, however, due to space limitation, employing multiple antennas in certain types of communication devices may not be practical (e.g., handset type devices). It is nonetheless noted that the various aspects of the invention are generally applicable to any wireless communication device. Many multiple antenna-MIMO communication systems require the use of multiple radio-frequency (RF) chains that connect the multiple antennas to other portions of the communication device, including a decoder therein. Such RF devices (amplifiers, demodulators, etc.) are costly and pose a major challenge to the expansion of MIMO systems in the market. The use of reconfigurable antennas in accordance with the approaches presented herein allows for improved overall performance while requiring fewer antennas within such a communication device thereby providing savings across many avenues including cost, real estate, complexity, power consumption, etc. by allowing the use of a much reduced number of antennas and RF chains. Through the capability of reconfigurable antennas and their ability dynamically to change their electrical and radiation properties (e.g., radiation state), combined with specific coding schemes of the transmitted signal, the propagation channel may be employed more efficiently.

Reconfigurable antennas arise as a promising solution to overcome many deficiencies in the prior art including those applications in which space is limited. A reconfigurable antenna is an antenna that can intentionally change its radiation pattern, operating frequency and/or polarization characteristics. Therefore, such a reconfigurable antenna is capable of creating additional degrees of freedom by intentionally changing the propagation characteristics of the communication channel via which the communication device communicates. By employing one or more reconfigurable antennas and by employing an appropriate transmission scheme (e.g., STS-BC), significant improvement in the performance of wireless communication systems may be achieved.

Herein, a communication system employing communication devices having one or more reconfigurable antennas are used at both ends of the wireless link (e.g., in a transmitting communication device and a receiving communication device). In addition, a novel open-loop channel coding transmission scheme may be employed which is capable of extracting the maximum diversity gains within such a communication system using reconfigurable antennas at the transmitter, receiver or both ends, without the need for feedback. As stated elsewhere herein, other embodiments may include feedback without departing from the scope and spirit of the invention.

The maximum achievable diversity order of a MIMO communication system employing reconfigurable antennas at the transmitter is given by the product of the number of transmit and receive antennas as well as the number of radiation states of the one or more reconfigurable transmit antennas. Also, the maximum achievable diversity order of a MIMO communication system employing one or more reconfigurable antennas at the transmitter and receiver is given by the product of the number of transmit and receive antennas as well as the number of radiation states of the one or more reconfigurable transmit antennas and the number of radiation states of the one or more one or more reconfigurable receive antennas.

Any of a variety of radiation state switching transmission schemes may be employed. One particular radiation state switching transmission scheme is based on the use of a code structure capable of taking advantage of the additional degrees of diversity offered by the number of channel propagation states provided by the use of one or more reconfigurable antennas. Generally, such a channel coding scheme is referred to as a Space-Time-State Block Code (STS-BC) because in addition to exploiting the time and space dimensions, such a channel coding scheme takes into account the propagation state diversity offered by the use of one or more reconfigurable antennas, thus effectively becoming a 3-dimensional code.

Operating a state-switching scheme within a communication system in accordance with one or more of the aspects presented herein, even without any feedback link (operating in an open loop implementation), is capable of achieving the maximum diversity gains. On the other hand, if reconfigurable antennas are employed at the receiver, although a state-switching scheme is still applicable, a state-selection scheme maybe employed to improve the performance in terms of the average received Signal to Noise Ratio (SNR) while achieving maximum diversity gains. Also, when reconfigurable antennas are used at both ends of the wireless link (in a transmitting communication device and a receiving communication device), both techniques may be combined and a state-switching scheme may be used at the transmitter and a state-selection scheme may also be used at the receiver.

Also, even in applications that employ switching devices (used within the radiating structure of one or more reconfigurable antennas), the switching delay of such switching devices may have some effect on such channel coding transmission schemes. Appropriate operation of such a communication device may be performed to reduce such possible losses that may be incurred due to the non-ideal switching time of such switching devices.

Herein, the following notation is employed in various locations: $(\cdot)^T$ and $(\cdot)^H$ to denote transpose and conjugate transpose, respectively. Moreover, $C^{M \times N}$ is used to denote the set of M×N matrices over the field of complex numbers and $\otimes$ to represent the Kronecker product of two matrices. Also, vec (A) denotes the vectorization of a matrix A by stacking its columns on top of one another. Furthermore, diag$\{A_1, A_2, \ldots, A_m\}$ represents a block-diagonal matrix whose block diagonal elements consists of $A_i$'s for $i \in \{1, \ldots, m\}$.

Within the framework of reconfigurable antennas, each possible way in which a reconfigurable antenna can radiate is referred to as its radiation state. If distinct radiation states are created by exciting different operational frequencies, the antenna is referred to as a frequency-reconfigurable antenna. In other cases, the radiation states are associated with distinct radiation patterns and/or polarizations. It is noted that any one or more of such characteristics may be modified when transitioning from a first radiation state to a second radiation state.

Consider that a reconfigurable antenna array is implemented at the receiver communication device with $M_R$ accessible ports that can be reconfigured into Q distinct radiation states, and also that a reconfigurable antenna array is also implemented at the transmitter communication device with $M_T$ accessible ports and P radiation states. Let $\Psi$ denote the total number of possible combinations in which the receive and transmit ports can be reconfigured. Each one of these combinations is referred to as a channel propagation state. When all the antenna ports are reconfigured simultaneously, then $\Psi = PQ$.

The following relationship, $$H_\psi \in C^{M_T \times M_R},$$

is employed to represent the channel matrix corresponding to the channel propagation state $\psi$. Notice that the $(i, j)^{th}$ entry of $H_\psi$, denoted by $h_\psi^{ij}$, represents the channel coefficient containing the gain and phase information of the path between the $i^{th}$ transmit port and the $j^{th}$ receive port in the $\psi^{th}$ channel propagation state.

Transmitter-Reconfigurable MIMO Implementation

An open-loop MIMO communication system employing reconfigurable antennas at the transmitter is described with respect to this embodiment. It is supposes that the reconfigurable antenna array at the transmitter has $M_T$ accessible ports that can be reconfigured into P radiation states and a non-reconfigurable antenna array (Q=1) at the receiver with $M_R$ accessible ports. Therefore, the total number of channel propagation states in this scenario is $\Psi = P$. Again, it is noted that this embodiment is an open loop application including no feedback.

Figure 10:
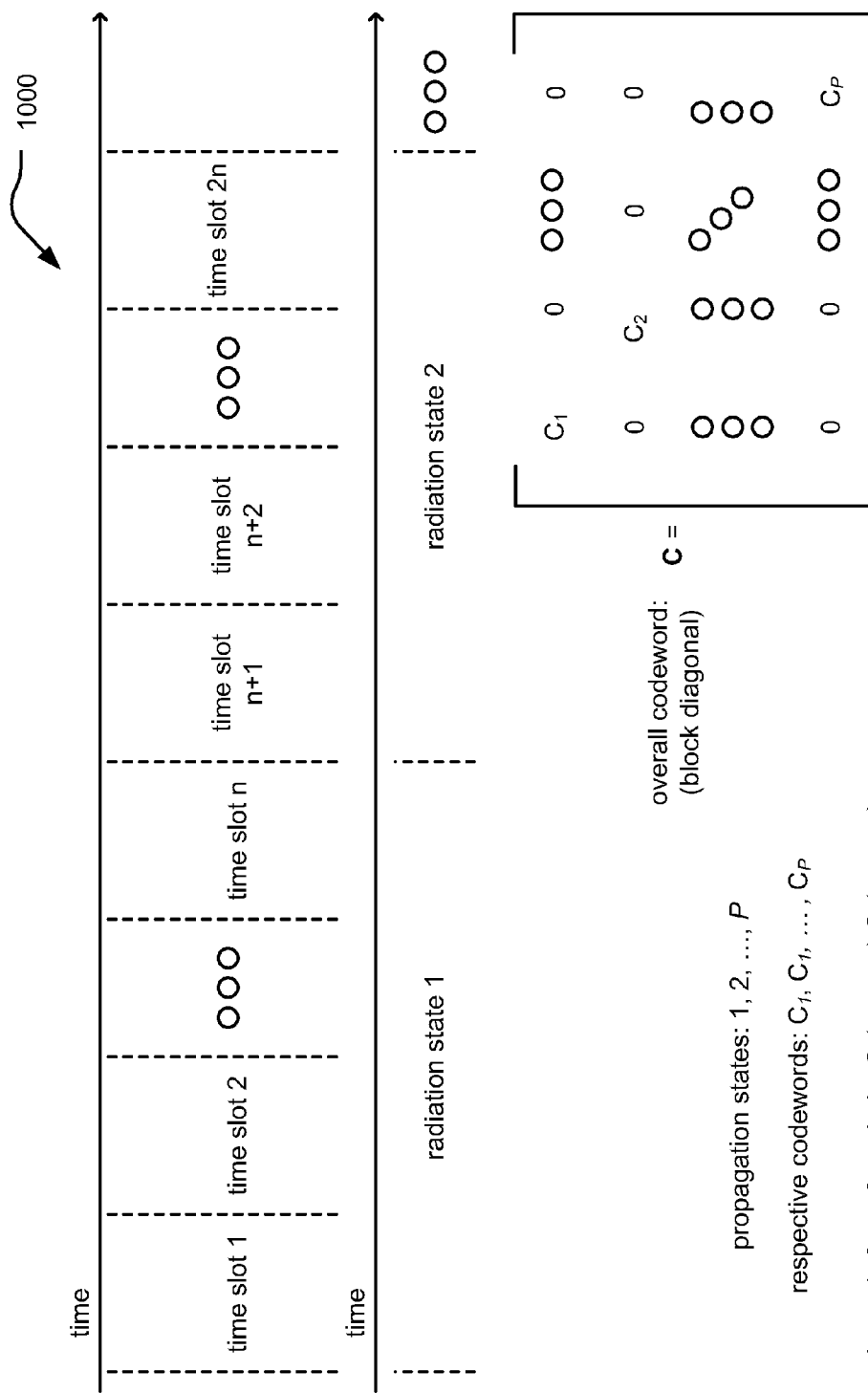
FIG. 10 is a diagram showing relationship between time slots and radiation states in accordance with an embodiment of a STS-BC and a generic mathematical representation of a codeword encompassing multiple propagation states.

Without any feedback from the receiver, a novel a scheme is proposed in which the reconfigurable antennas at the transmitter periodically switch their radiation states. As a result, the propagation characteristics of the channel are intentionally changed in a periodic manner (e.g., see FIG. 5 and FIG. 6 for related embodiments), creating a block fading channel. It is assumed that the switching time in between radiation states is much smaller than the symbol duration, and is therefore negligible in most instances. Also, such an implementation employs a receiver that is operative to perform channel characterization and estimation, while the transmitter does not have such information related to the communication channel. It is assumed that the communication channel is in state p, where $p \in \{1, 2, \ldots, P\}$, for the duration of T time slots. The codeword transmitted during the $p^{th}$ state of the channel is denoted by $C_p \in C^{T \times M_T}$. The state-switching scheme requires the reconfigurable transmit antenna to change its radiation state every T time slots therefore creating distinct channels for the transmission of each codeword $C_P$. FIG. 10, as described below, also shows how an antenna may remain in a particular radiation state during multiple time slots. The overall codeword encompassing all P channel propagation states, depicted as $C \in C^{DT \times DM_T}$, may be represented in matrix format as follows:

$$C = \begin{bmatrix} C_1 & 0 & \cdots & 0 \\ 0 & C_2 & 0 & 0 \\ \vdots & \vdots & \ddots & \vdots \\ 0 & 0 & \cdots & C_P \end{bmatrix}. \quad (1)$$

Then, the general receive equation over all P channel propagation states is given as follows:

$$Y = CH + N, \quad (2)$$

where, $Y \in C^{PT \times M_R}$ is the received matrix over all states, $H \in C^{PM_T \times M_R}$ is the overall channel matrix and $N \in C^{PT \times M_R}$ is a zero-mean circularly symmetric Gaussian noise matrix consisting of statistically independent components of identical power $N_0$. Now, for $p \in \{1, \ldots, P\}$, let $Y_p \in C^{T \times M_R}$, $H_p \in C^{M_T \times M_R}$ and $N_p \in C^{T \times M_R}$ denote the received matrix, the channel matrix and the noise matrix during state p, respectively. Eq. (2) can be rewritten as follows:

$$Y_p = C_p H_p + N_p \qquad (3)$$

where, $p \in \{1, \ldots, P\}$ and the $(i,j)^{th}$ entry of $H_p$, denoted by $h_{ij}^p$, represent the channel coefficient between the $i^{th}$ transmit antenna and the $j^{th}$ receive antenna during state p. For a pure Rayleigh fading channel (e.g., no line of sight component), the entries of $H_p$ are zero-mean complex Gaussian random variables.

Transmitter-Reconfigurable MIMO Implementation with Feedback

This analysis assumes a closed-loop MIMO system that is employing reconfigurable antennas at the transmitter. Suppose that the reconfigurable antenna array at the transmitter has $M_T$ accessible ports that can be reconfigured into P radiation states and a non-reconfigurable antenna array (Q=1) at the receiver with $M_R$ accessible ports. Therefore, the total number of channel propagation states in this scenario is $\Psi$=P. Also, such an implementation employs a receiver that is operative to perform channel characterization and estimation, while the transmitter does not have such information related to the communication channel. Furthermore, it is assumed there is a feedback link from the receiver side to the transmitter side that can transmit $\log_2 P$ number of bits.

Let us assume we have perfect channel estimation at the receiver. Initially, the transmitter creates a set of P channel propagation states by switching the radiation states of the transmit antenna in P radiation states. Meanwhile, for each channel propagation state $p \in \{1, \ldots, P\}$, the receiver measures the Frobenius norm of the channel ($\|H_p\|$) and using a single state selection approach as presented herein, selects the channel propagation state that maximizes the received SNR.

$$m = \arg \max_{p \in \{1, \ldots, P\}} \|H_p\|^2$$

Then through the feedback link, the receiver sends back the index m corresponding to the radiation state of the transmit antenna which produces the maximum SNR at the receiver. Having received the feedback information, the transmitter now sets its radiation state to m and fixes the channel propagation state as $H_m$. This state-selection scheme provides full-diversity benefits and also produces a selection gain over the state-switching scheme resulting in an increase in the average received SNR. Therefore, when feedback is available, by using state-selection at the transmitter, better performance can be achieved when compared to using state-switching. However, if a feedback link is not available in a given embodiment, then state-switching can be used.

FIG. 4, FIG. 5, FIG. 6, FIG. 7, and FIG. 8 area diagrams of various embodiments of radiation state switching and/or selection as may be performed within a wireless communication device.

Figure 4:
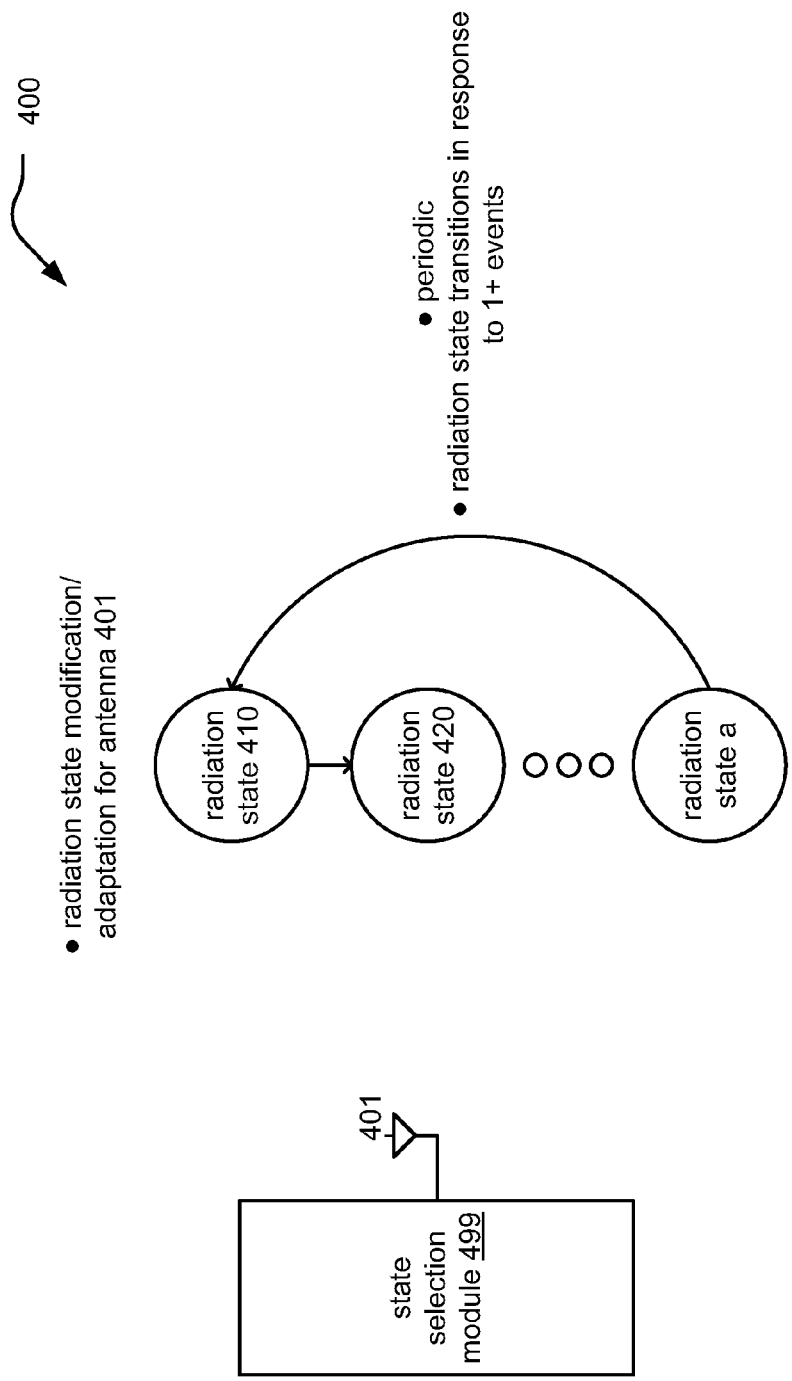
FIG. 4, FIG. 5, FIG. 6, FIG. 7, and FIG. 8 area diagrams of various embodiments of radiation state switching and/or selection as may be performed within a wireless communication device.

Referring to the embodiment 400 of FIG. 4, a communication device may include as few as a singular antenna 401. The changing operation of a communication device among more than one radiation state may be effectuated by a state selection module 499 that is implemented in or communicatively coupled to the communication device. Of course, other functional blocks, modules, and/or circuitries within a communication device may alternatively effectuate such radiation state modification/adaptation without departing from the scope and spirit of the invention.

In this as well as other embodiments, the transition among various radiation states (e.g., from among radiation states 410, 420, and up to an a-th radiation state, in which a may any integer as desired in a particular embodiment) may be periodic in nature, in that, it may be based upon synchronization with some other parameter (e.g., system clock) with which the communication device has access. Also, in certain embodiments, both a transmitting communication device and a receiving communication device may be synchronized with such additional parameter such that each of the transmitting communication device and a receiving communication device perform radiation state transition synchronously with each other.

It is noted that even in a periodic type embodiment, the amount of time in which the communication device operates using each respective radiation state need not be identical. For example, the amount of time the communication device operates in radiation state 410 may be different than the amount of time the communication device operates in radiation state 420, and so on. Also, in even other embodiments, the transition from among the various radiation states may be in response to one or more events, such that the communication device operating within a particular radiation state until one or more events occurs.

Figure 5:
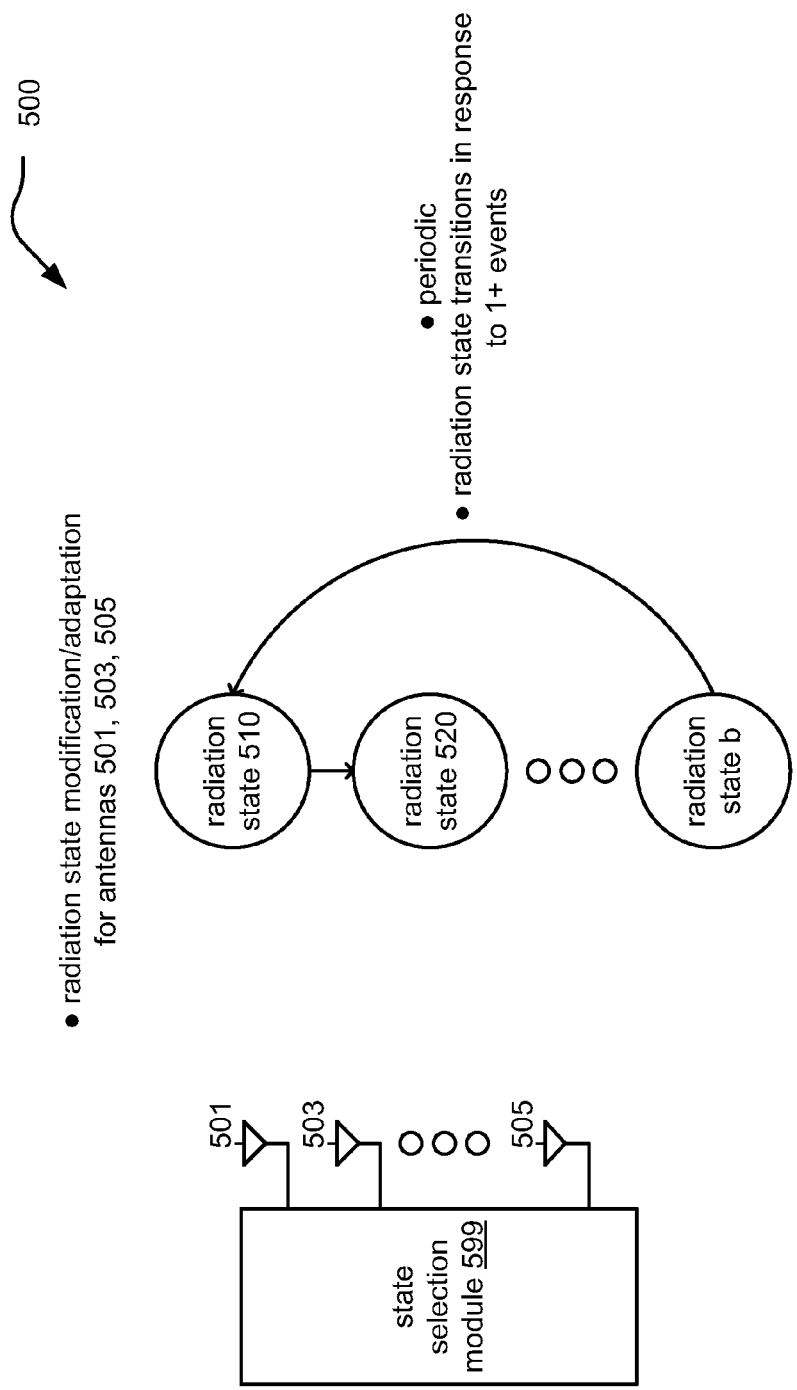
Figure 6:
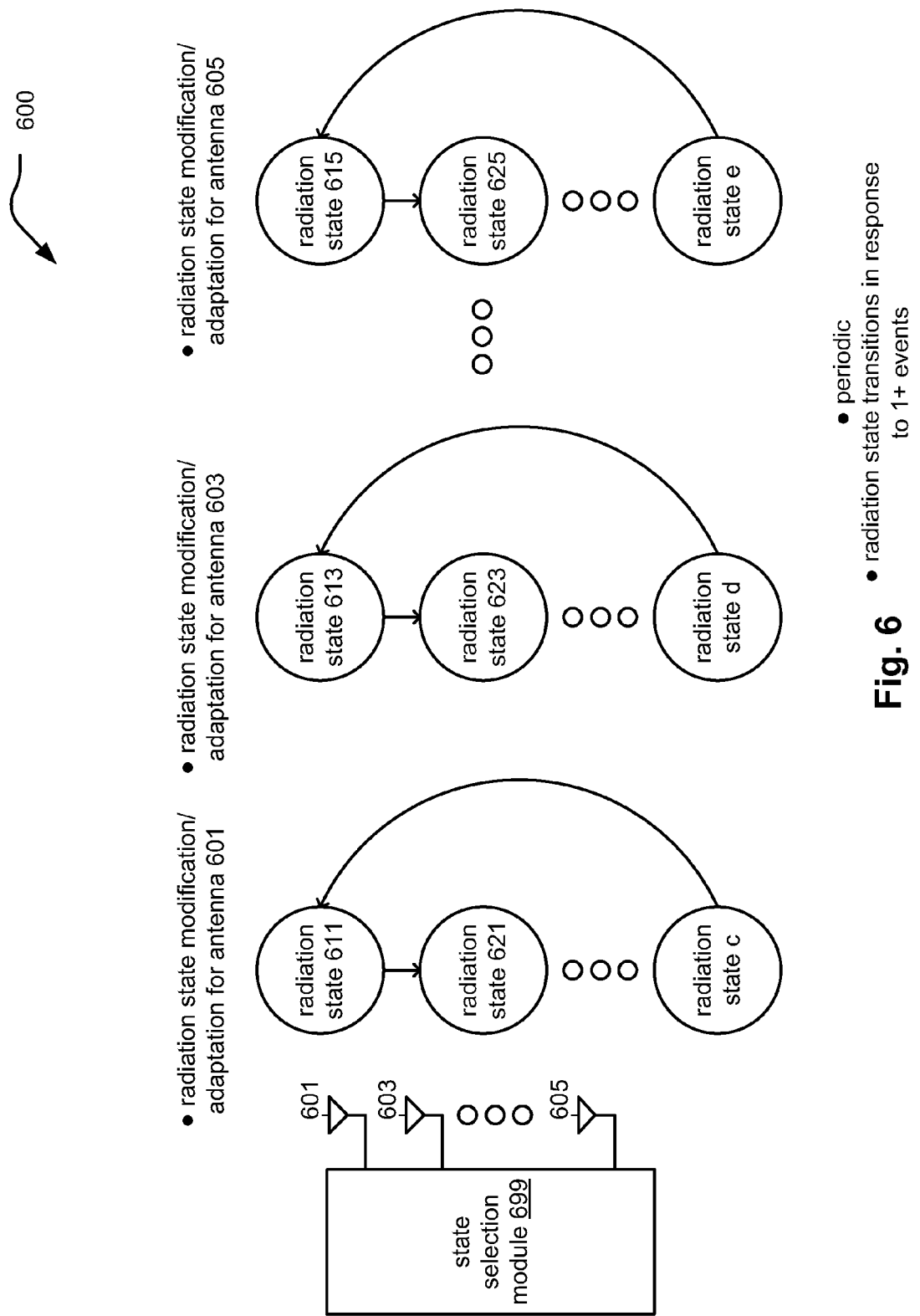
Figure 7:
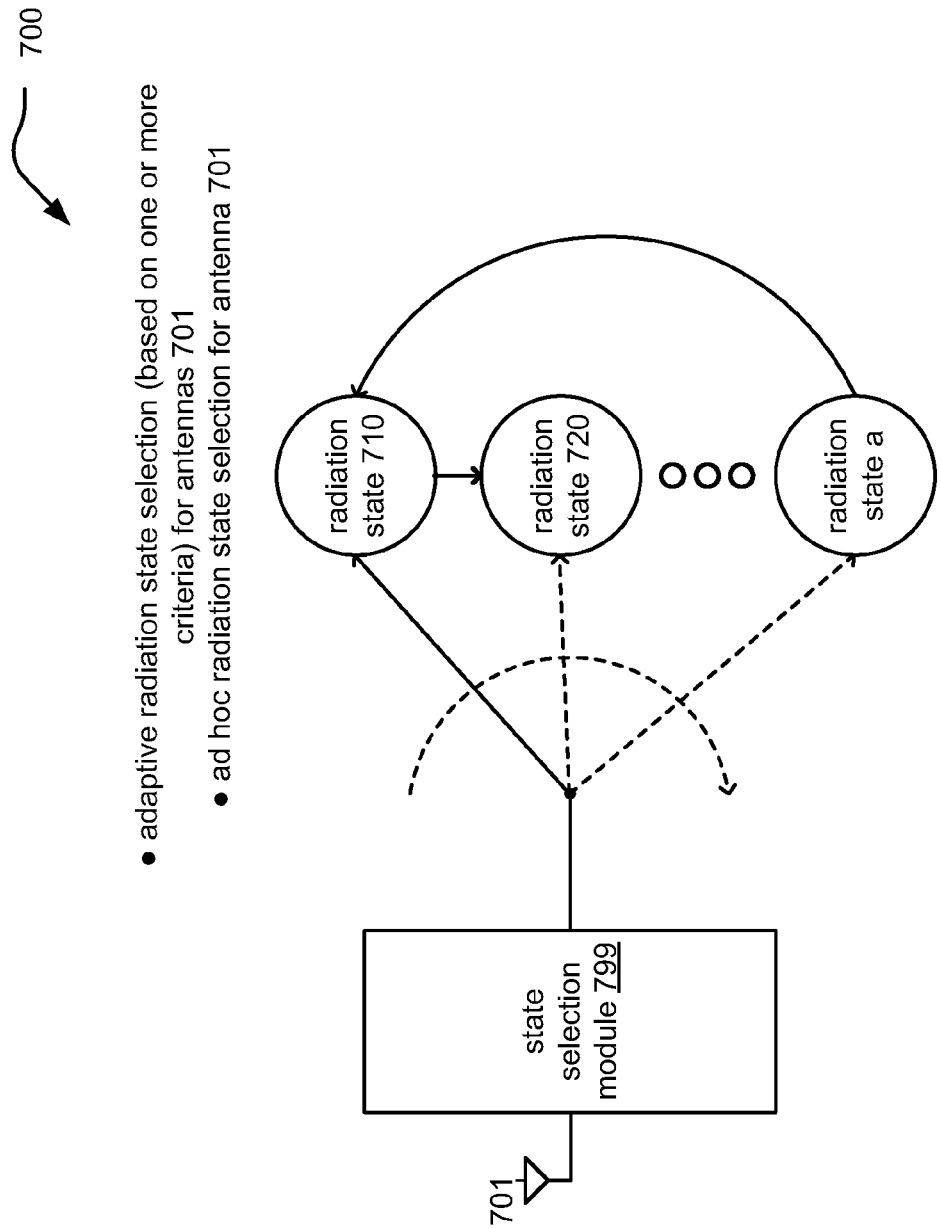
Figure 8:
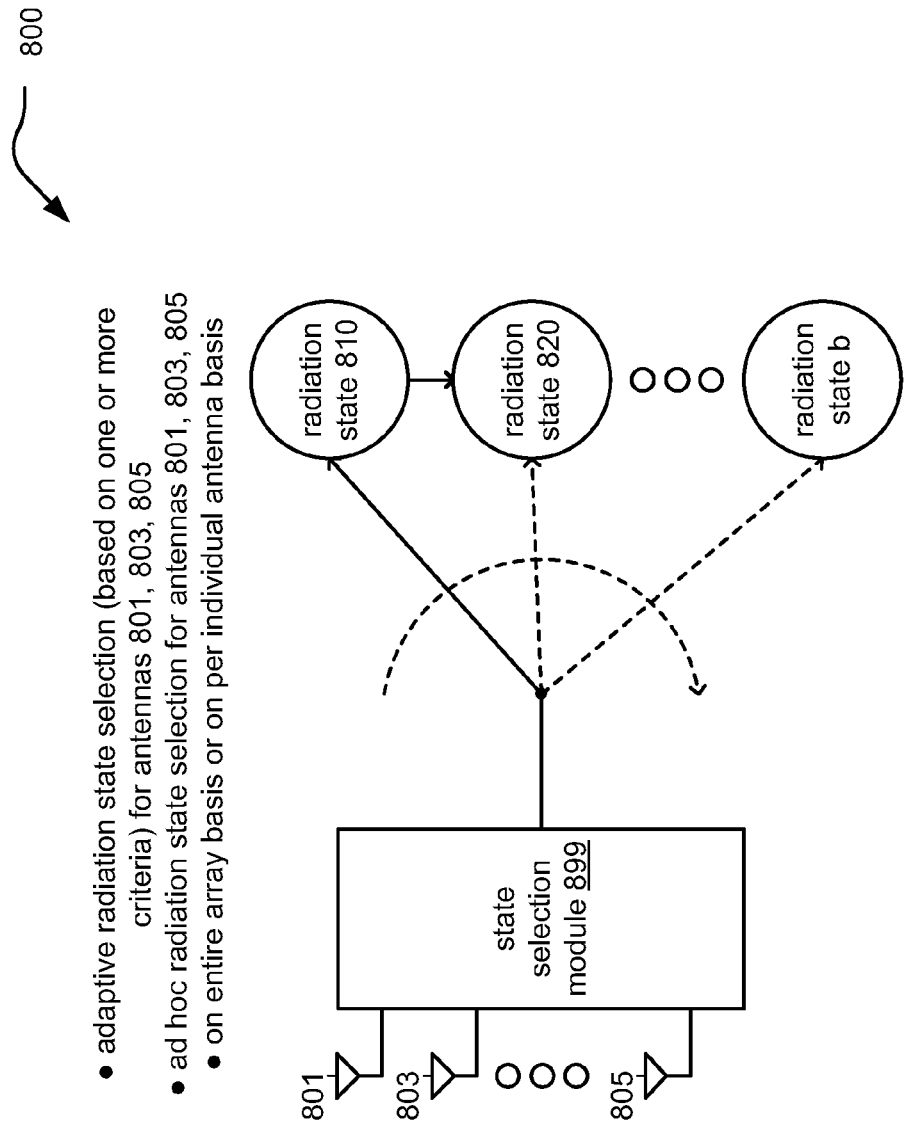

Referring to the embodiment 500 of FIG. 5, a communication device may alternatively include multiple antennas, as shown by 501, 503, . . . , and up to 505 (e.g., generally any number greater than or equal to two antennas). In this embodiment as within others, the changing operation of a communication device among more than one radiation state (e.g., from among radiation states 510, 520, and up to an b-th radiation state, in which b may any integer as desired in a particular embodiment) may be effectuated by a state selection module 599 that is implemented in or communicatively coupled to the communication device. Of course, other functional blocks, modules, and/or circuitries within a communication device may alternatively effectuate such radiation state modification/adaptation without departing from the scope and spirit of the invention.

The various comments made above in regards to radiation state transition between various radiation states in a communication device including a singular antenna are also applicable with this embodiment, with at least one difference being that the communication device of this 500 embodiment may include two or more antennas. In this embodiment, the radiation state transition corporately affects all of the two or more antennas 501-505 similarly.

Referring to the embodiment 600 of FIG. 6, again, a communication device may alternatively include multiple antennas, as shown by 601, 603, . . . , and up to 605 (e.g., generally any number greater than or equal to two antennas). In this embodiment as within others, the changing operation of a communication device among more than one radiation state (e.g., from among radiation states 611, 621, and up to an c-th radiation state, in which c may any integer as desired in a particular embodiment; from among radiation states 613, 623, and up to an d-th radiation state, in which d may any integer as desired in a particular embodiment; and from among radiation states 615, 625, and up to an e-th radiation state, in which e may any integer as desired in a particular embodiment) may be effectuated by a state selection module 699 that is implemented in or communicatively coupled to the communication device. Of course, other functional blocks, modules, and/or circuitries within a communication device may alternatively effectuate such radiation state modification/adaptation without departing from the scope and spirit of the invention.

Again, the various comments made above in regards to radiation state transition between various radiation states in a communication device including a singular antenna or multiple antennas are also applicable with this embodiment. In this embodiment, the radiation state transition individually and respectively affects all of the two or more antennas 601-605. For example, each of the various antennas 601-605 may perform radiation state modification/adaptation independently, in that, the various antennas need not synchronously be making radiation state modification/adaptation. Each respective antenna may under modification/adaptation independently and not necessarily with regards to the radiation state status of other antennas within the communication device. Of course, in alternative embodiments, even with the individual operation of radiation state modification/adaptation among the antenna, there may nonetheless be some coordination among them between them.

It is also noted that since the transitions between the respective radiation states need not necessarily be synchronous in nature, the times at which each respective antenna transitions between radiation states need not be the same, and the amount of time each respective antenna spends operating in each of its receptive radiation states need also not be the same. In other words, by operating each respective antenna independent of the other antennas provides yet another means by which diversity may be effectuated in accordance with channel coding.

Referring to the embodiment 700 of FIG. 7, again, a communication device may include as few as a singular antenna 701. The changing operation of a communication device among more than one radiation state may be effectuated by a state selection module 799 that is implemented in or communicatively coupled to the communication device. Of course, other functional blocks, modules, and/or circuitries within a communication device may alternatively effectuate such radiation state modification/adaptation without departing from the scope and spirit of the invention (e.g., from among radiation states 710, 720, and up to an a-th radiation state, in which a may any integer as desired in a particular embodiment).

However, at least one manner by which this embodiment 700 differs from others is that the modification/adaptation among various radiation states is selectable and need not necessarily progress through a particular path or route of radiation state transitions. For example, the communication device may operate its antenna 701 within any one of a number of radiation states. The communication device may select one radiation state at one time, and then select another radiation state at another time based on any number of one or more types of criteria. Alternatively, the communication device may select one radiation state at one time, and then select another radiation state based upon an ad hoc selection implementation.

In some instances, when a communication device is operating in a closed loop manner, a feedback signal may be provided to the communication device from at least one additional communication device that receives transmitted signals from the communication device. Based upon the feedback signal, the communication device may perform radiation state modification/adaptation thereby selecting the next radiation state in which the communication device will operate.

The one or more criteria by which a communication device may perform modification/adaptation among various radiation states and selection of one radiation state from among the radiation states may include, though is not limited to, signal to noise ratio (SNR), noise, throughput (e.g., data rate), interference, error rate (e.g., Bit Error Rate (BER) and/or Block Error Rate (BLER)), etc. of a communication channel by which the communication device communicates. Alternatively, such one or more criteria may include operational parameters corresponding to the communication device itself such as available/remaining energy (e.g., remaining energy in a communication device having a finite amount of energy such as remaining battery life in a communication device being battery powered), rates of energy consumption (e.g., rates of power expended during transmission and/or receiving of signals), noise incurred within the communication device, environmental conditions in which the communication device is operating (e.g., temperature, humidity, and/or changes thereof, etc.), and/or any other operational parameters corresponding to the communication device itself, etc.

Referring to the embodiment 800 of FIG. 8, again, a communication device may alternatively include multiple antennas, as shown by 801, 803, . . . , and up to 805 (e.g., generally any number greater than or equal to two antennas). In this embodiment as within others, the changing operation of a communication device among more than one radiation state may be effectuated by a state selection module 899 that is implemented in or communicatively coupled to the communication device. Of course, other functional blocks, modules, and/or circuitries within a communication device may alternatively effectuate such radiation state modification/adaptation without departing from the scope and spirit of the invention (e.g., from among radiation states 810, 820, and up to an b-th radiation state, in which b may any integer as desired in a particular embodiment).

The various comments made above in regards to radiation state modification/adaptation in selecting among various radiation states in a communication device including a singular antenna are also applicable with this embodiment, with at least one difference being that the communication device of this embodiment 800 may include two or more antennas. In this embodiment, the radiation state adaptation may corporately affect all of the two or more antennas 801-805 similarly, or it may alternatively affect each of the two or more antennas 801-805 individually and independently. In other words, the radiation state modification/adaptation may be on an entire array basis or on a per individual antenna basis. When operating in accordance with a per individual antenna basis, different criteria may be employed respectively in directing radiation state modification/adaptation for each individual antenna. Of course, the same one or more criteria may alternatively be employed for all antennas if desired.

A block code is described herein capable of achieving maximum spatial and state diversity gains by coding across three dimensions: space, time and channel propagation state (associated with radiation state or one or more antennas within a transmitter and/or receiver). Such a channel code may be referred to as a Space-Time-State Block Code (STS-BC).

Figure 9:
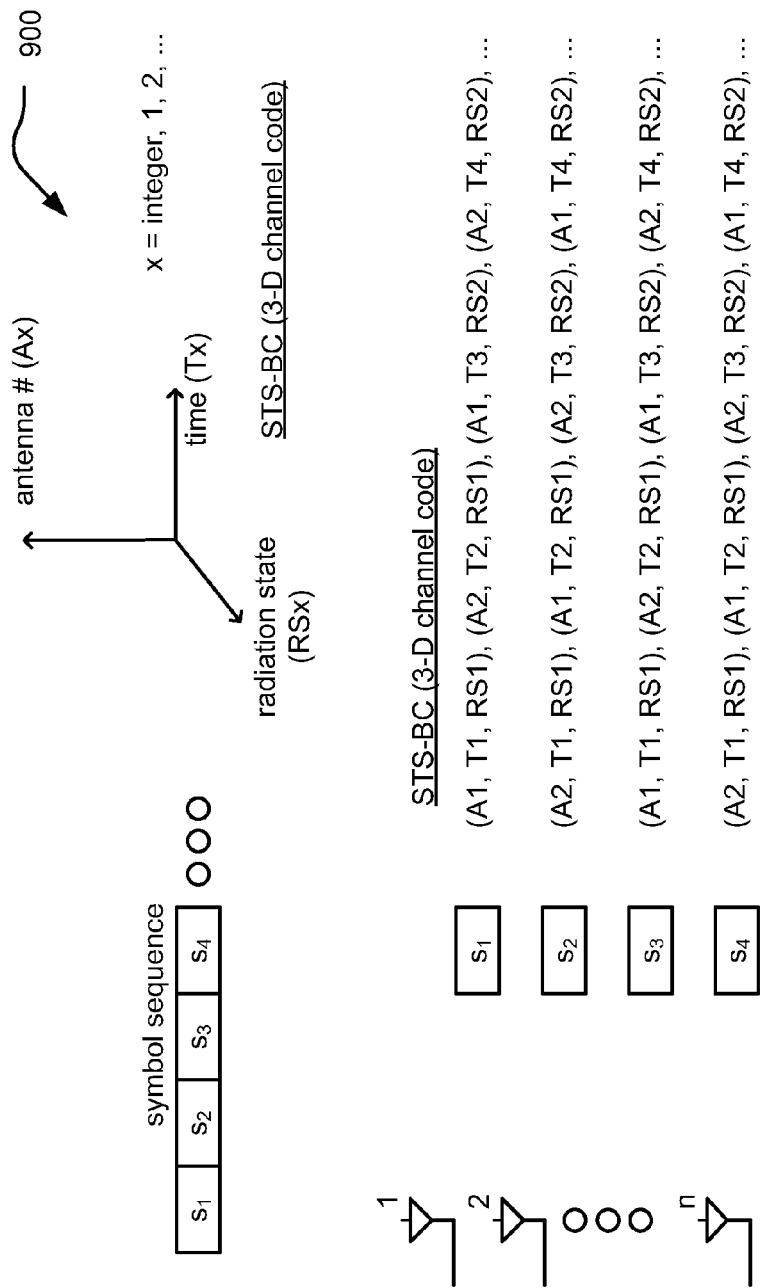
FIG. 9 is a diagram showing multi-dimensional diversity as may be achieved using a Space-Time-State Block Code (STS-BC) when operating a wireless communication device.

FIG. 9 is a diagram showing multi-dimensional diversity 900 as may be achieved using a Space-Time-State Block Code (STS-BC) when operating a wireless communication device. A STS-BC may be viewed as being a multi-dimensional code for performing channel coding of signals to be transmitted via a communication channel. As may be seen, a symbol sequence may undergo arrangement such that the respective symbols thereof may be transmitted in accordance with such a STS-BC across multiple antenna (shown as antennas 1, 2, . . . , up to n).

As may be seen in this embodiment and others, it is noted that a particular symbol may be transmitted from different antennas at different times when the respective antennas are in different, respective radiation states. The increased diversity provided by such a STS-BC allows for much improvement performance (such as higher throughput) and lower error rates.

FIG. 10 is a diagram showing relationship between time slots and radiation states in accordance with an embodiment of a STS-BC and a generic mathematical representation of a codeword encompassing multiple propagation states. This diagram shows how an antenna may remain in a particular radiation state during multiple time slots. As mentioned above with respect to equation (1), the overall codeword encompassing all P channel propagation states, depicted as $C \in C^{PT \times PM_T}$, may be represented in a matrix format. Each of the codewords may be formed by block arranged symbols and/or combination thereof. In other words, the overall codeword encompassing all P channel propagation states may be viewed as being a block-diagonal matrix.

FIG. 11 is a diagram showing a generic mathematical representation of a codeword encompassing multiple propagation states 1100, and specifically related to an embodiment of a communication device including two antennae. In this embodiment, the code is designed for $M_T=2$ transmit antennas, however extension of the STS-BC to $M_T>2$ is straightforward. That is to say, the code structure and both the state-switching and state-selection schemes are applicable to any number of transmit and/or receive antennas and respectfully traverses of the one or more reconfigurable antennas.

Let us denote an STS-BC code which codes across P channel propagation states, by STS-BC-P. Such an STS-BC-P being a generalized block-diagonal channel code may be represented as follows:

$$C = \frac{1}{\sqrt{2P}} \begin{bmatrix} A(S_1, S_2) & 0 & \ldots & 0 & 0 \\ 0 & A(S_3, S_4) & 0 & 0 & \\ \vdots & \vdots & \ddots & \vdots & \\ 0 & 0 & \ldots & 0 & A(S_{2P-1}, S_{2P}) \end{bmatrix} \quad (4)$$

Where, $C_P = A(S_{2P-1}, S_{2P})$ for $p \in \{1, 2, \ldots, P\}$, $A(x_1, x_2) = \begin{bmatrix} x_1 & x_2 \\ -x_2^* & x_1^* \end{bmatrix}$ and $[S_1 \; S_3 \; \ldots \; S_{2P-1}]^T = \Theta[s_1 \; s_3 \; \ldots \; s_{2P-1}]^T,$ \quad (5a)

$[S_2 \; S_4 \; \ldots \; S_{2P}]^T = \Theta[s_2 \; s_4 \; \ldots \; s_{2P}]^T,$ \quad (5b)

where, $\Theta = U \times \text{diag}\{1, e^{j\theta_1}, \ldots, e^{j\theta_{P-1}}\}$ and $U$ is a $P \times P$ Hadamard matrix.

It is noted that the order of a Hadamard matrix is 1, 2 or a multiple of 4. Therefore if a Hadamard matrix of size P does not exist, first a Hadamard matrix of size P' may be constructed, where P' is the smallest integer greater than P for which a Hadamard matrix exists, then its rows and columns are truncated to form the matrix U. it is noted that $\theta_i$'s are such that, for $p \in \{1, \ldots, P\}, |S_{2p-1} - \hat{S}_{2p-1}| \neq 0$ Unless $[S_1 \; s_3 \; \ldots \; s_{2P-1}]=0$ and similarly, $|S_{2p-1} - \hat{S}_{2p-1}| \neq 0$ unless $[s_2 \; s_4 \; \ldots \; s_{2P}]=0$. Furthermore, the optimal rotation angles, $\theta_i$'s, are chosen to maximize the coding gain, generally by means of exhaustive search. The codeword given by (4) is capable of achieving the following.

Diversity of STS-BC-P:

$$q = M_R \sum_{p=1}^{P} r_p$$

$$= M_R \sum_{p=1}^{P} \text{rank}\{(|S_{2p-1} - \hat{S}_{2p-1}|^2 + |S_{2p} - \hat{S}_{2p}|^2) I_2\}$$

$$= M_T M_R P = 2 M_R P$$

Coding gain of STS-BC-P:

$$\prod_{p=1}^{P} \prod_{n=1}^{r_p} \lambda_n^p = \prod_{p=1}^{P} \det(F(C_p, \hat{C}_p))$$

$$= \prod_{p=1}^{P} (|S_{2p-1} - \hat{S}_{2p-1}|^2 + |S_{2p} - \hat{S}_{2p}|^2)^2$$

where, it has been noted that for $p \in \{1, \ldots, P\}$, $r_p=2$ and $F(C_p, \hat{C}_p)$'s are full-rank. Now, as an example, consider the case of P=2 radiation states. In such a scenario, the maximum possible diversity gain is equal to $M_T M_R P = 4M_R$. At each state $p \in \{1, 2\}$, the following codewords, $C_p$'s, are transmitted from the $M_T=2$ antennas as follows:

$$C_1 = \frac{1}{2}\begin{bmatrix} s_1 + \tilde{s}_3 & s_2 + \tilde{s}_4 \\ -s_2^* - \tilde{s}_4^* & s_1^* + \tilde{s}_3^* \end{bmatrix}, \quad (6)$$

$$C_2 = \frac{1}{2}\begin{bmatrix} s_1 - \tilde{s}_3 & s_2 - \tilde{s}_4 \\ -(s_2^* - \tilde{s}_4^*) & s_1^* - \tilde{s}_3^* \end{bmatrix}.$$

where $\tilde{s}_i = e^{j\theta} s_i$.

Therefore $$C = \frac{1}{2}\begin{bmatrix} s_1 + \tilde{s}_3 & s_2 + \tilde{s}_4 & 0 & 0 \\ -s_2^* - \tilde{s}_4^* & s_1^* + \tilde{s}_3^* & 0 & 0 \\ 0 & 0 & s_1 - \tilde{s}_3 & s_2 - \tilde{s}_4 \\ 0 & 0 & -(s_2^* - \tilde{s}_4^*) & s_1^* - \tilde{s}_3^* \end{bmatrix}. \quad (7)$$

As another example, consider P=5 radiation states. It is noted that no Hadamard matrix of order 5 exists, therefore first a Hadamard matrix of size 8 may be chosen, corresponding to the U matrix for STS-BC-8. Then, taking only $\{S_1, S_2, \ldots, S_{10}\}$ and setting $S_{11}=S_{12}=\ldots=S_{16}=0$, the corresponding U matrix for STS-BC-5 is obtained as follows:

$$U = \begin{bmatrix} 1 & 1 & 1 & 1 & 1 \\ 1 & -1 & 1 & -1 & 1 \\ 1 & 1 & -1 & -1 & 1 \\ 1 & -1 & -1 & 1 & 1 \\ 1 & 1 & 1 & 1 & -1 \end{bmatrix}. \quad (8)$$

The optimal rotation angles for the STS-BC-5, using BPSK, are derived by exhaustive search using a step size of $\pi/32$. The optimal values, which maximize the coding gain, are found to be $\theta_1=0.5890$, $\theta_2=1.1781$, $\theta_3=2.4544$, and $\theta_4=1.8653$.

It is noted that the Maximum Likelihood (ML) decoding of STS-BC can be simplified into minimizing two independent functions $f_1(.)$ and $f_2(.)$, where $f_1(.)$ is only a function of $\{s_1, s_3, \ldots, s_{2p-1}\}$ while $f_2(.)$ only contains the symbols $\{s_2, s_4, \ldots, s_{2P}\}$. For example, the code in (7) has pairwise ML decoding where the pairs of symbols $(S_i, s_3)$ and $(s_2, s_4)$ are decoded independently.

To derive the expression for the received SNR for a STS-BC-P codeword given by Eq. (4), one can vectorize Eq. (2) as follows:

$$\mathcal{Y} = (I_{M_R} \otimes C)\underline{H} + \underline{N}, \text{ where}$$
$$\mathcal{Y} = \text{vec}(Y),$$
$$\mathcal{H} = \text{vec}(H), \text{ and}$$
$$\mathcal{N} = \text{vec}(N).$$

Now, the equivalent receive equalization can be written as follows:

$$\tilde{y} = \mathcal{H}\tilde{C} + \mathcal{N},$$

where, $$\tilde{C} = \frac{1}{\sqrt{2P}}[S_1 \ \ldots \ S_{2P}]^T.$$

It is noted that, with respect to the expectation over the statistics of noise, the received SNR for STS-BC-P can be expressed as follows:

$$SNR = \frac{\|H_1\|_F^4 + \ldots + \|H_P\|_F^4}{2N_0(\|H_1\|_F^2 + \ldots + \|H_P\|_F^2)}. \quad (9)$$

Receiver-Reconfigurable MIMO Communication System

Considering a receiver-reconfigurable MIMO communication system, one embodiment may include a non-reconfigurable antenna array (P=1) at the transmitter with $M_T$ accessible ports and a reconfigurable antenna array at the receiver with $M_R$ accessible ports that is capable of reconfiguring its ports into Q radiation states. Notice that in this case the total number of channel propagation states is given by $\Psi = Q$.

When reconfigurable antennas are employed at the receiver, although the above-mentioned state-switching scheme is still applicable (in one embodiment by periodically switching the radiation states of the receive antennas), a state-selection scheme may be implemented to provide improved performance in terms of the average received SNR. In such a state-selection scheme, the set of radiation states of the receive antennas is selected that maximizes the SNR at the receiver, and afterwards data is transmitted using the STS-BC at the encoder and state-switching among the set of selected states at the receiver. Various options of performing such state selection are described below:

1) Optimal Selection Scheme: Using Eq. (9) for the received SNR, the optimal selection criterion is to choose the Z states, $\{i_1, \ldots, i_z\}$ out of a total of Q states (denoted by (Z, Q)) such that $$(i_1, \ldots, i_Z) = \arg\max_{\substack{i_1, \ldots, i_Z \\ 1 \leq i_1, \ldots, i_Z \leq Q}} \frac{\|H_{i_1}\|_F^4 + \ldots + \|H_{i_Z}\|_F^4}{\|H_{i_1}\|_F^2 + \ldots + \|H_{i_Z}\|_F^2}. \quad (10)$$

2) An Ad hoc Selection Scheme: To provide a simpler metric, an ad hoc selection criterion may be employed and it may be seen that it achieves the maximum diversity gain. Furthermore, the ad hoc selection scheme is equivalent to the optimal selection scheme. The ad hoc selection criterion is to choose a set of Z radiation states, $\{i_1, \ldots, i_Z\}$ out of the total of Q available states, such that $$(i_1, \ldots, i_Z) = \arg\max_{\substack{i_1, \ldots, i_Z \\ 1 \leq i_1, \ldots, i_Z \leq Q}} \|H_{i_1}\|_F^2 + \ldots + \|H_{i_Z}\|_F^2. \quad (11)$$

Transmitter/Receiver-Reconfigurable MIMO Communication System

Considering a transmitter/receiver-reconfigurable MIMO communication system, such an embodiment may be viewed as being a natural extension of the above-mentioned scenarios, in which the MIMO system uses reconfigurable antennas at both ends of the wireless link (e.g., at the transmitter end and the receiver end of the communication channel).

Assume we have $M_T$ reconfigurable transmit antennas that can be reconfigured into P distinct radiation states, and $M_R$ reconfigurable receive antennas with Q radiation states. Also, it is assumed that there is no feedback (e.g., open loop) and that the transmitter and receiver are synchronized with one another. The total number of channel propagation states in this scenario is given by $\Psi = PQ$.

A combination of the above-mentioned state-switching scheme at the transmitter and state-selection scheme at the receiver may be employed. The channel propagation states $\{H_1, H_2, \ldots, H_\Psi\}$ are assumed to be independent. At the transmit end of the communication system, state-switching over the P radiation states of the transmit antenna is employed. At the receiver end, the following selection scheme may be employed:

Selection Scheme: For any transmitter state $p \in \{1, 2, \ldots, P\}$, choose the receiver state $i_p \in \{(p-1)Q+1, (p-1)Q+2, \ldots pQ\}$, such that:

$$\forall p \in \{1, 2, \ldots, P\}: i_p = \arg\max_{(p-1)Q+1 \leq i_p \leq pQ} \|H_{i_p}\|^2. \quad (12)$$

In this instance, it is assumed that there is a reconfigurable antenna at the transmitter is in state p where $p \in \{1, 2, \ldots, P\}$, now of the reconfigurable receive antenna sets its radiation state to $i_p$ where $i_p \in \{(p-1)Q+1, (p-1)Q+2, \ldots, pQ\}$. The system model for the aforementioned scheme is given by $$Y_p = C_p H_{i_p} | N_p \text{ for } p \subset [1, \ldots, P]. \quad (13)$$

Transmitter/Receiver-Reconfigurable MIMO Implementation with Feedback

A MIMO communication system that uses reconfigurable antennas at both ends of the wireless link is considered. It is assumed that $M_T$ reconfigurable transmit antennas are employed in a communication device that can be reconfigured into P distinct radiation states, and $M_R$ reconfigurable receive antennas with Q radiation states. It may be assumed that the transmitter and receiver are synchronized with one another. The total number of channel propagation states in this scenario is given by $\Psi = PQ$. Furthermore, a feedback link is implemented that is capable of transmitting $\log_2 P$ bits of information from the receiver back to the transmitter.

Among the set of channel propagation states, the receiver selects the channel propagation state $i_p$ which has the maximum Frobenius norm, thus maximizing the received SNR. At the receiver end, the following selection scheme may be proposed:

Selection Scheme:

$$\forall p \in \{1, 2, \ldots, P\}: i_p = \arg\max_{p \in \{1, 2, \ldots, P\}} \max_{(p-1)Q+1 \leq i_p \leq pQ} \|H_{i_p}\|^2$$

Through the feedback link, the receiver sends the index p back to the transmitter, using $\log_2 P$ bits. At the transmitter end of the communication system, the radiation state of the transmitting antenna is set to the corresponding state. Again, it is noted that the transmitter and receiver are synchronized with one another in such an embodiment.

Also, as mentioned elsewhere herein, even in applications that employ switching devices (used within the radiating structure of one or more reconfigurable antennas), the switching delay of such switching devices may have some effect on such channel coding transmission schemes. Appropriate operation of such a communication device may be performed to reduce such possible losses that may be incurred due to the non-ideal switching time of such switching devices. An analysis of the switching delay as may be incurred with such switching devices is provided.

In order to change its radiation characteristics, a reconfigurable antenna may use a series of switching devices (e.g., micro-electro-mechanical systems (MEMs), positive intrinsic negative (PIN) diodes, field-effect transistors (FETs), etc.) strategically located within the structure of the antenna. In an actual communication device, the switching delay may not be negligible. The effects of switching delay are incorporated into a communication device and/or communication system below. It is noted that the switching time affects state-switching and state-selection schemes differently. Some issues that may be introduced by the switching delay are as follows:

1) Lower data rate for state-switching scheme
2) Loss in the received SNR for state-selection scheme Effects of Switching Time in State-Switching Scheme The reduction in data rate due to switching delay is quantified below and a means is presented to mitigate the any associated reduction in data rate.

The variable G is defined as the equivalent number of transmitted symbols that a particular switching device uses to change its state from the ON to the OFF state, or vice-versa. For example, assuming a MEM switch device with a switching time of 100 μs over an IS-136 system architecture, G=3. Now, the variable η is defined as the rate efficiency of the sequence of data symbols, as below $$\eta = \frac{T}{T+G} \quad (14)$$

where T is the length of the codeword transmitted during each channel propagation state. It is noted that each time the state of the transmitting antenna is changed, a guard band of G symbols may be employed to assure that the desired channel configuration is achieved. In this case η can be relatively small. For example, for an IS-136 system using $M_T$=2 transmit antennas and the Alamouti code, T=2 and therefore η(%)=40%. This means that the switching delay of MEMS switches can incur a 40% spectral efficiency loss to the system.

There are several mechanisms to overcome such limitations in practical systems. A first approach is to use other low-loss switching devices which have a much faster switching speed, such as diodes or field-effect transistors (FETs). However, these devices experience larger losses at high frequencies compared to MEMS switches. On the other hand, a second approach is to trade-off decoding delay with data rate. The decoding delay of the system may be denoted by $\tau_{dec}$. In a state-switching scheme, the decoding delay is given by $\tau_{dec}$=PT. If the system requirements allow, one could tradeoff the decoding delay of the system up to a point where η≈1, by transmitting not one but B'>>1 codewords within the same channel propagation state. In this case, η can be expressed as $$\eta = \frac{TB'}{TB'+G} \quad (15)$$

where B' represents the number of codewords of length T transmitted during each channel propagation state. In other words, once switch the channel propagation state has been switched, B' independent codewords are transmitted. Within the next channel propagation state, the second set of codewords associated with the first B' codewords are transmitted and so on. By choosing B' large enough, one can make η as close to 1 as desired. It is noted that the receiver needs to collect all the P codewords associated with one STS-BC-P to be able to recover the transmitted codeword, therefore this scheme increases the decoding delay of the system to $\tau_{dec}$=PTB'.

Effects of Switching Time in State-Selection Scheme

Below, loss in average received SNR due to the changes in the wireless channel during the switching time is analyzed. The average SNR for the state-selection scheme may be derived as follows:

$$\varepsilon(\gamma) = 1 + \frac{1}{2} + \ldots + \frac{1}{Q}, \quad (16)$$

where, γ represents the received SNR. If the switching delay is long compared to the coherence time of the channel, the channel gains undergo significant changes during the switching time. This means that if the channel propagation state q* is selected as the state producing the largest received SNR, by the changes incurred to all channels during the switching transition, $H_{q*}$ does not represent the optimal channel anymore and this results in a loss in the received SNR. After the switching delay, it is assumed that $\|H_{q*}\|^2$ is the r'th largest SNR among the set of all SNR's corresponding to the Q channel propagation states. Therefore the loss in the average SNR is quantified as follows:

$$L(r) = \frac{1 + \frac{1}{2} + \ldots + \frac{1}{Q}}{\frac{1}{r} + \ldots + \frac{1}{Q}}.$$

It is noted that if the switching delay is large compared to the coherence time of the channel, one can assume that the channels change independently, which corresponds to the worst case scenario. In this case the average loss in SNR is quantified as follows:

$$L_{avg} = \frac{\sum_{r=1}^{Q} L(r)}{Q} = 1 + \frac{1}{2} + \ldots + \frac{1}{Q}. \quad (17)$$

FIG. 12A, FIG. 12B, FIG. 13A, FIG. 13B, FIG. 14A, and FIG. 14B illustrate various embodiments of methods for operating a communication device in accordance with various types of STS-BCs.

Referring to method 1200 of FIG. 12A, the method 1200 begins by transmitting a first symbol via a reconfigurable antenna configured in a first radiation state during a first time, as shown in a block 1210. The method 1200 continues by transmitting a second symbol via the reconfigurable antenna configured in a second radiation state during a second time, as shown in a block 1220.

This embodiment may operate with as few as a singular reconfigurable antenna whose radiation state operative to be modified and to perform transmissions there from at different times (e.g., providing for both time and radiation state diversity in accordance with channel coding). It is also noted that, in some embodiments, the first symbol and the second symbol may be the very same symbol (i.e., the same symbol is transmitted from the reconfigurable antenna during each of the first time and the second time as the reconfigurable antenna is configured in each of the first radiation state and the second radiation state, respectively).

Referring to method 1201 of FIG. 12B, the method 1201 begins by transmitting a first symbol via a reconfigurable antenna configured in a first radiation state during a first time, as shown in a block 1211. The method 1201 then operates by transmitting a second symbol via the reconfigurable antenna configured in the first radiation state during a second time, as shown in a block 1221.

The method 1201 continues by transmitting the first symbol via the reconfigurable antenna configured in a second radiation state during a third time, as shown in a block 1231. The method 1201 then operates by transmitting the second symbol via the reconfigurable antenna configured in the second radiation state during a fourth time, as shown in a block 1241.

This embodiment operates with two or more reconfigurable antennas whose respective radiation states are operative to be modified and to perform transmissions there from at different times (e.g., providing for each of antenna, time, and radiation state diversity in accordance with channel coding).

Figure 13B:
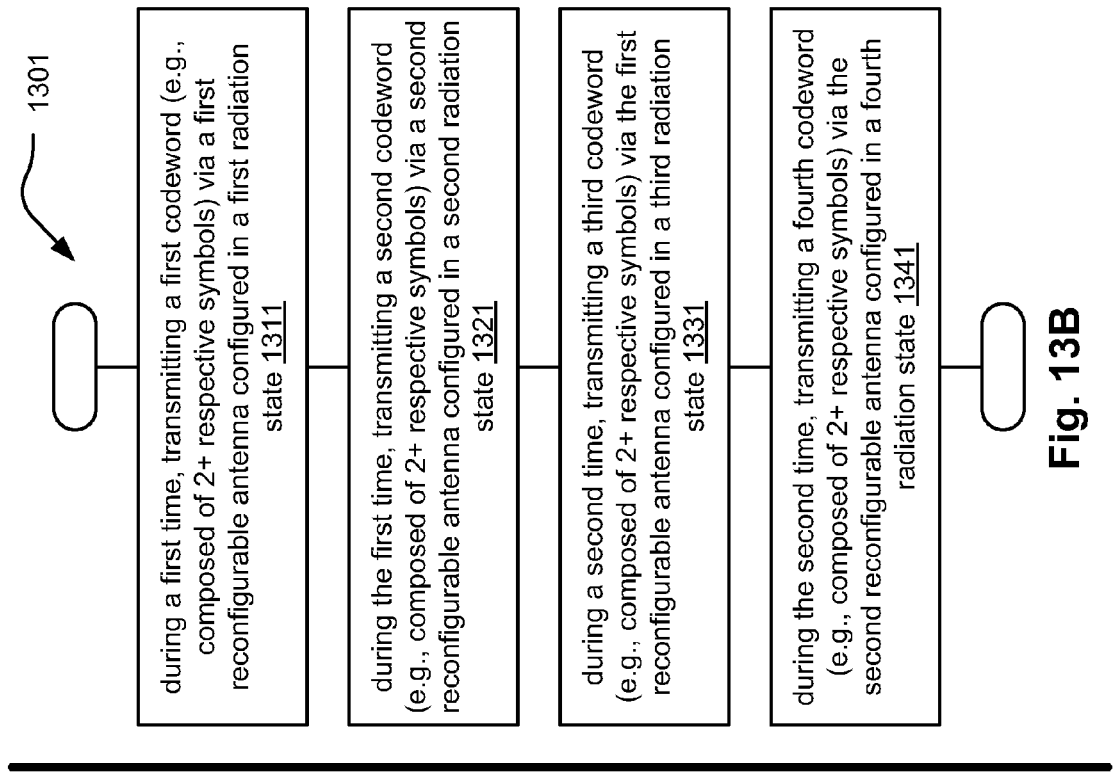
Figure 13A:
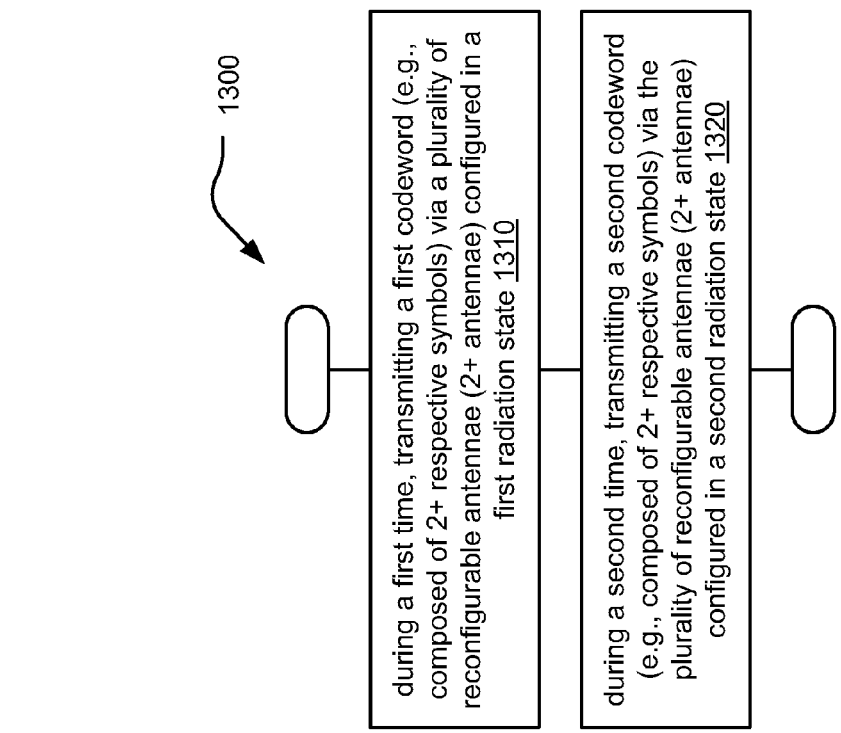

Referring to method 1300 of FIG. 13A, the method 1300 begins by transmitting a first codeword (e.g., composed of 2+ respective symbols) via a plurality of reconfigurable antennae (2+ antennae) configured in a first radiation state during a first time, as shown in a block 1310. The method 1300 continues by transmitting a second codeword (e.g., composed of 2+ respective symbols) via the plurality of reconfigurable antennae (2+ antennae) configured in a second radiation state during a second time, as shown in a block 1320.

This embodiment employs codewords each respectively composed of multiple symbols. As within other embodiments, as few as a singular reconfigurable antenna whose radiation state operative to be modified and to perform transmissions there from at different times (e.g., providing for both time and radiation state diversity in accordance with channel coding).

Referring to method 1301 of FIG. 13B, the method 1301 begins by transmitting a first codeword (e.g., composed of 2+ respective symbols) via a first reconfigurable antenna configured in a first radiation state during a first time, as shown in a block 1311. The method 1301 then operates by transmitting a second codeword (e.g., composed of 2+ respective symbols) via a second reconfigurable antenna configured in a second radiation state during the first time, as shown in a block 1321.

The method 1301 continues by transmitting a third codeword (e.g., composed of 2+ respective symbols) via the first reconfigurable antenna configured in a third radiation state during a second time, as shown in a block 1331. The method 1301 then operates by transmitting a fourth codeword (e.g., composed of 2+ respective symbols) via the second reconfigurable antenna configured in a fourth radiation state during the second time, as shown in a block 1341.

This embodiment also employs codewords each respectively composed of multiple symbols. As within other embodiments, two or more reconfigurable antennas whose respective radiation states are operative to be modified and to perform transmissions there from at different times (e.g., providing for each of antenna, time, and radiation state diversity in accordance with channel coding).

Figures 14A, 14B:
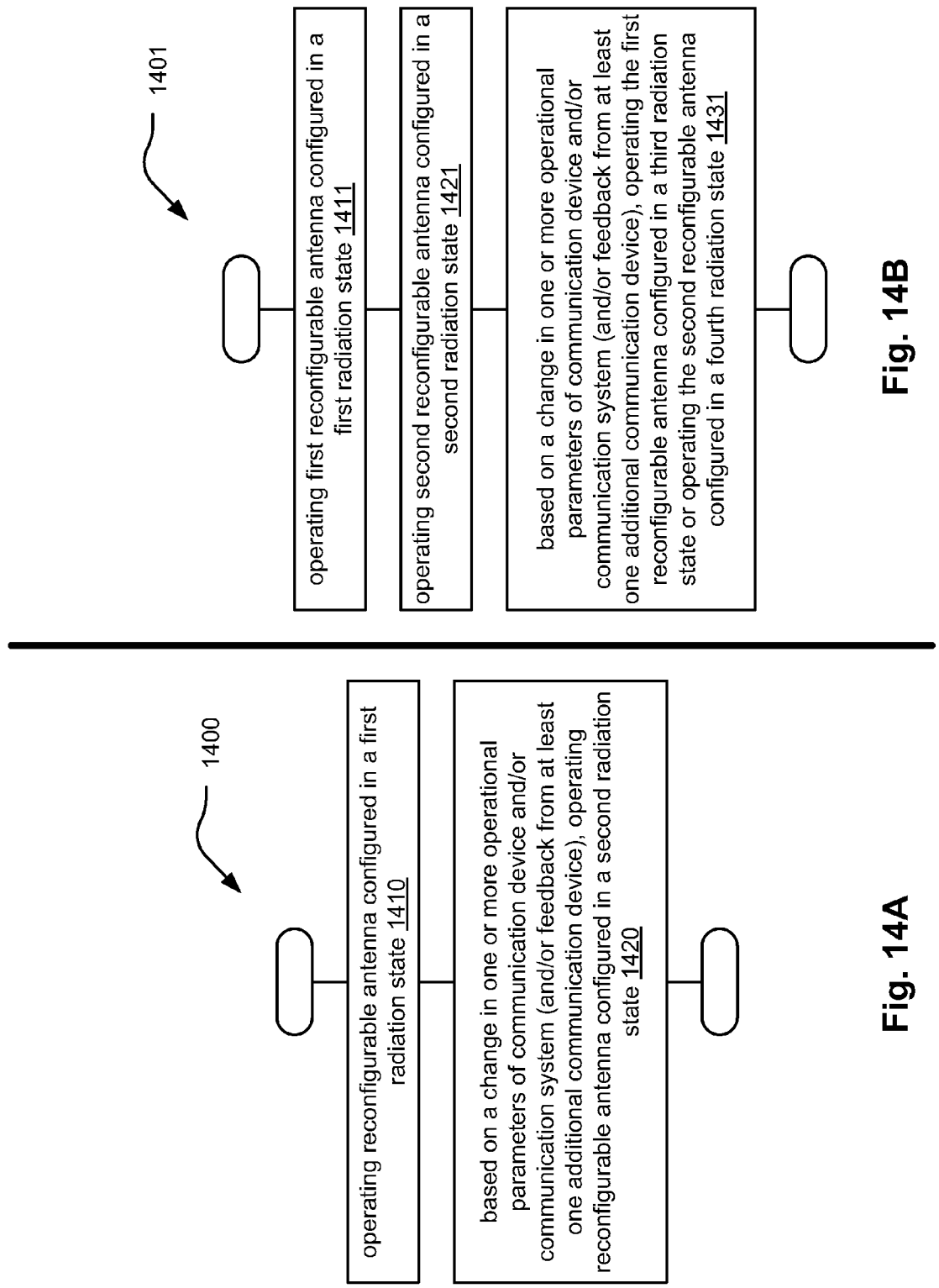

Referring to method 1400 of FIG. 14A, the method 1400 begins by operating reconfigurable antenna configured in a first radiation state, as shown in a block 1410. The method 1400 continues by operating reconfigurable antenna configured in a second radiation state based on a change in one or more operational parameters of communication device and/or communication system (and/or feedback from at least one additional communication device), as shown in a block 1420.

Referring to method 1401 of FIG. 14B, the method 1401 begins by operating first reconfigurable antenna configured in a first radiation state, as shown in a block 1411. The method 1401 then operates by operating second reconfigurable antenna configured in a second radiation state, as shown in a block 1421. The method 1401 continues by operating the first reconfigurable antenna configured in a third radiation state or operating the second reconfigurable antenna configured in a fourth radiation state based on a change in one or more operational parameters of communication device and/or communication system (and/or feedback from at least one additional communication device), as shown in a block 1431.

From some perspectives, each of the previous two embodiments may be viewed as operating adaptively in response to one or more operational parameters and/or changes of one or more operational parameters. As mentioned elsewhere, any one or more operational parameters may correspond communication channel related characteristics such as signal to noise ratio (SNR), noise, throughput (e.g., data rate), interference, error rate (e.g., Bit Error Rate (BER) and/or Block Error Rate (BLER)), etc. Alternatively, any one or more operational parameters may correspond to a communication device itself such as its available/remaining energy (e.g., remaining energy in a communication device having a finite amount of energy such as remaining battery life in a communication device being battery powered), rates of energy consumption (e.g., rates of power expended during transmission and/or receiving of signals), noise incurred within the communication device, environmental conditions in which the communication device is operating (e.g., temperature, humidity, and/or changes thereof, etc.), and/or any other operational parameters corresponding to the communication device itself, etc.

It is noted that the various modules, functional blocks, and/or circuitries (e.g., for performing encoding, decoding, state selection, configuration, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

What is claimed is:

1. An apparatus, comprising:
a state selection module; and
a reconfigurable antenna for transmitting:
   a first symbol during a first time while configured in a first radiation state as directed by the state selection module; and
   a second symbol during a second time while configured in a second radiation state as directed by the state selection module,
wherein the reconfigurable antenna also transmitting the second symbol during the first time while configured in the first radiation state as directed by the state selection module; or
the reconfigurable antenna also transmitting the first symbol during the second time while configured in the second radiation state as directed by the state selection module.

2. The apparatus of claim 1, further comprising:
at least one additional reconfigurable antenna for transmitting:
   a third symbol during the first time while configured in a third radiation state as directed by the state selection module; and
   a fourth symbol during the second time while configured in a fourth radiation state as directed by the state selection module.

3. The apparatus of claim 1, further comprising:
at least one additional reconfigurable antenna for transmitting:
the second symbol during the first time while configured in a third radiation state as directed by the state selection module; and
the first symbol during the second time while configured in a fourth radiation state as directed by the state selection module.

4. The apparatus of claim 1, wherein:
the first radiation state corresponding to at least one of a first radiation pattern, a first operating frequency, and a first polarization characteristic of the reconfigurable antenna; and
the second radiation state corresponding to at least one of a second radiation pattern, a second operating frequency, and a second polarization characteristic of the reconfigurable antenna.

5. The apparatus of claim 1, wherein:
a plurality of reconfigurable antennae, that includes the reconfigurable antenna, for transmitting a plurality of symbols, that includes the first symbol and the second symbol; and wherein:
the first radiation state corresponding to at least one of a first radiation pattern, a first operating frequency, and a first polarization characteristic of a first of the plurality of reconfigurable antennae; and
the second radiation state corresponding to at least one of a second radiation pattern, a second operating frequency, and a second polarization characteristic of a second of the plurality of reconfigurable antennae.

6. The apparatus of claim 1, further comprising:
a plurality of reconfigurable antennae, that includes the reconfigurable antenna, for transmitting a plurality of symbols, that includes the first symbol and the second symbol; and wherein:
the first radiation state or the second radiation state corresponding to at least one of a first radiation pattern, a first operating frequency, and first polarization characteristic of a first of the plurality of reconfigurable antennae and corresponding to at least one of a second radiation pattern, a second operating frequency, and a second polarization characteristic of a second of the plurality of reconfigurable antennae.

7. The apparatus of claim 1, wherein:
the apparatus receiving a feedback signal from at least one additional apparatus to which at least one of the first symbol and the second symbol being transmitted; and
based on the feedback signal, the state selection module adaptively directing the reconfigurable antenna to be configured in at least one additional radiation state.

8. The apparatus of claim 1, wherein:
the state selection module directing operation of the reconfigurable antenna in accordance with a Space-Time-State Block Code (STS-BC).

9. The apparatus of claim 1, further comprising:
a plurality of reconfigurable antennae, that includes the reconfigurable antenna, for transmitting a plurality of symbols, that includes the first symbol and the second symbol; and wherein:
the apparatus being a communication device; and
the communication device being operative within a multiple input multiple output (MIMO) communication system.

10. An apparatus, comprising:
a first reconfigurable antenna for transmitting:
  a first symbol during a first time while configured in a first radiation state in accordance with a Space-Time-State Block Code (STS-BC); and
  a second symbol during a second time while configured in a second radiation state in accordance with the STS-BC;
a second reconfigurable antenna for transmitting:
  a third symbol during the first time while configured in a third radiation state in accordance with the STS-BC; and
  a fourth symbol during the second time while configured in a fourth radiation state in accordance with the STS-BC,
wherein the first reconfigurable antenna also transmitting at least one of the second symbol, the third symbol, and the fourth symbol during the first time while configured in the first radiation state in accordance with the STS-BC.

11. The apparatus of claim 10, further comprising:
a state selection module for directing operation of the first reconfigurable antenna and the second reconfigurable antenna based on the STS-BC.

12. The apparatus of claim 10, wherein:
the apparatus receiving a feedback signal from at least one additional apparatus to which at least one of the first symbol, the second symbol, the third symbol, and the fourth symbol being transmitted; and
the apparatus adaptively modifying the STS-BC based on the feedback signal.

13. The apparatus of claim 10, wherein:
the apparatus being a communication device; and the communication device being operative within a multiple input multiple output (MIMO) communication system.

14. A method, comprising:
from a first reconfigurable antenna, transmitting a first symbol during a first time while configured in a first radiation state in accordance with a Space-Time-State Block Code (STS-BC);
from the first reconfigurable antenna, transmitting a second symbol during a second time while configured in a second radiation state in accordance with the STS-BC;
from a second reconfigurable antenna, transmitting a third symbol during the first time while configured in a third radiation state in accordance with the STS-BC;
from the second reconfigurable antenna, transmitting a fourth symbol during the second time while configured in a fourth radiation state in accordance with the STS-BC; and
from the first reconfigurable antenna, also transmitting at least one of the second symbol, the third symbol, and the fourth symbol during the first time while configured in the first radiation state in accordance with the STS-BC.

15. The method of claim 14, further comprising:
adaptively modifying the STS-BC based on a feedback signal received from a communication device to which at least one of the first symbol, the second symbol, the third symbol, and the fourth symbol being transmitted.

16. The method of claim 14, wherein:
the first radiation state corresponding to at least one of a first radiation pattern, a first operating frequency, and a first polarization characteristic of the first reconfigurable antenna;
the second radiation state corresponding to at least one of a second radiation pattern, a second operating frequency, and a second polarization characteristic of the second reconfigurable antenna;
the third radiation state corresponding to at least one of a third radiation pattern, a third operating frequency, and a third polarization characteristic of the first reconfigurable antenna; and
the fourth radiation state corresponding to at least one of a fourth radiation pattern, a fourth operating frequency, and a fourth polarization characteristic of the second reconfigurable antenna.

17. The method of claim 14, wherein:
the method being performed within a communication device; and
the communication device being operative within a multiple input multiple output (MIMO) communication system.

* * * * *

UNITED STATES PATENT AND TRADEMARK OFFICE
CERTIFICATE OF CORRECTION

PATENT NO.        : 8,638,872 B2  
APPLICATION NO.   : 12/748366  
DATED             : January 28, 2014  
INVENTOR(S)       : Fatemeh Fazel et al.

Page 1 of 1

It is certified that error appears in the above-identified patent and that said Letters Patent is hereby corrected as shown below:

The title page, item [75] inventor: Jafakhani should read as follows: --Jafarkhani--

Signed and Sealed this
Twenty-second Day of April, 2014

Michelle K. Lee
*Deputy Director of the United States Patent and Trademark Office*